(12) United States Patent
Popo et al.

(10) Patent No.: US 11,099,857 B2
(45) Date of Patent: Aug. 24, 2021

(54) NETWORK VIRTUAL INFRASTRUCTURE DEPLOYMENT AND MANAGEMENT

(71) Applicant: Charter Communications Operating, LLC, St. Louis, MO (US)

(72) Inventors: Rachel Popo, Parker, CO (US);
Yehuda Yefet, Englewood, CO (US);
Bryan Zaffino, Littleton, CO (US);
Sagar Parikh, Littleton, CO (US);
Dino Starinieri, Parker, CO (US); John D. Bolton, Aurora, CO (US); Craig McDonnell, Castle Pines, CO (US);
Nate Getrich, Shawnee, CO (US); Jay Rolls, Englewood, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 14 days.

(21) Appl. No.: 16/276,603

(22) Filed: Feb. 14, 2019

(65) Prior Publication Data
US 2020/0264897 A1 Aug. 20, 2020

(51) Int. Cl.
G06F 9/00 (2006.01)
G06F 15/177 (2006.01)
G06F 9/4401 (2018.01)
G06F 9/445 (2018.01)
H04L 29/08 (2006.01)
(Continued)

(52) U.S. Cl.
CPC ........ *G06F 9/4416* (2013.01); *G06F 9/44505* (2013.01); *G06F 9/45558* (2013.01); *H04L 41/0806* (2013.01); *H04L 67/34* (2013.01); *G06F 2009/45562* (2013.01)

(58) Field of Classification Search
CPC .............. G06F 9/4416; G06F 9/44505; G06F 9/45558; G06F 2009/45562; H04L 67/34; H04L 41/0806
See application file for complete search history.

(56) References Cited

U.S. PATENT DOCUMENTS 7,792,963 B2   9/2010  Gould
10,055,309 B1*  8/2018  Samad ................ G06F 11/1464
2003/0056217 A1  3/2003  Brooks
(Continued)

OTHER PUBLICATIONS

HashiCorp, Introduction to Terraform, pp. 1-2, downloaded Sep. 25, 2018 from https://www.terraform.io/intro/index.html.
(Continued)

*Primary Examiner* — Nitin C Patel
(74) *Attorney, Agent, or Firm* — Otterstedt, Wallace & Kammer, LLP

(57) ABSTRACT

For parallel deployment of a plurality of virtual systems in a broadband network, an electronic data structure is obtained, which specifies a set of requirements for each of the plurality of virtual systems to be deployed in parallel. The sets of requirements in the electronic data structure are parsed to obtain a plurality of virtual system creation instruction files, one for each of the virtual systems to be deployed in parallel. A plurality of threads are executed in parallel, one for each of the virtual systems to be deployed in parallel, in accordance with the plurality of virtual system creation instruction files, to build the plurality of virtual systems.

20 Claims, 27 Drawing Sheets

(51) Int. Cl.
*G06F 9/455* (2018.01)
*H04L 12/24* (2006.01)

(56) References Cited

U.S. PATENT DOCUMENTS

| | | |
|---|---|---|
| 2006/0130107 A1 | 6/2006 | Gonder et al. |
| 2007/0217436 A1 | 9/2007 | Markley |
| 2009/0248794 A1 | 10/2009 | Helms |
| 2010/0313236 A1 | 12/2010 | Straub |
| 2013/0212581 A1* | 8/2013 | Edwards ............... G06F 21/562 718/1 |
| 2015/0074659 A1* | 3/2015 | Madsen .............. G06F 9/45558 717/177 |

OTHER PUBLICATIONS

Wikipedia, JSON, pp. 1-13, downloaded Jan. 12, 2019 from https://en.wikipedia.org/wiki/JSON.

Oracle, Understanding PXE Booting and Kickstart Technology, pp. 1-3, downloaded Jan. 12, 2019 from https://docs.oracle.com/cd/E24628_01/em.121/e27046/appdx.pxeboot.h . . . .

* cited by examiner

* ILLUSTRATES TASKS PERFORMED IN PARALLEL FOR EFFICIENCY

FIG. 19

| TYPE | NAME | SERVICES |
|---|---|---|
| PRIMARY PXE | ottr-pxe | NGINX, DHCPD, TFTP |
| RELAY | ottr-dhcp-ma1 | DHCPD, TFTP |
| RELAY | ottr-dhcp-ss | DHCPD, TFTP |

FIG. 20

| | | | | | |
|---|---|---|---|---|---|
| /dev/loop4 | 3.7G | 3.7G | 0 | 100% | /var/www/tftp/centos/69 |
| /dev/loop2 | 4.3G | 4.3G | 0 | 100% | /var/www/tftp/centos/1708 |
| /dev/loop3 | 4.1G | 4.1G | 0 | 100% | /var/www/tftp/centos/1511 |
| /dev/loop5 | 4.2G | 4.2G | 0 | 100% | /var/www/tftp/centos/65 |
| /dev/loop1 | 825M | 825M | 0 | 100% | /var/www/tftp/ubuntu/1604 |
| /dev/loop0 | 4.1G | 4.1G | 0 | 100% | /var/www/tftp/centos/1611 |
| /dev/loop6 | 3.7G | 3.7G | 0 | 100% | /var/www/tftp/rhel/rhel69 |
| /dev/loop7 | 3.8G | 3.8G | 0 | 100% | /var/www/tftp/rhel/rhel74 |
| /dev/loop8 | 3.7G | 3.7G | 0 | 100% | /var/www/tftp/centos/68 |
| ... | | | | | |

FIG. 21A

```
Template CentOS KiskStart:
"???" and "####var####" represents data that will be generated by OTTR-FIRE

##################
Built using Ottr #
##################

# System authorization information
auth --enableshadow --passalgo=sha512
# Use CDROM installation media
#cdrom
url --url="http:// #### FQDN #### .com/tftp/####os####/####version####/"
# Use text mode install
text
# Run the Setup Agent on first boot
#ignoredisk --only-use=sda
# Keyboard layouts
keyboard --vckeymap=us --xlayouts=' '
# System language
lang en_US.UTF-8 firstboot --disabled
poweroff
#reroot
selinux --disabled

# Root password
rootpw --iscrypted ???

# System services
services --disable=NetworkManager --enabled=network

# Do not configure the X Window System
skipx
```

```
# System timezone
timezone US/Mountain --isUtc

# Partition clearing information
zerombr

#Disk partitioning information
####parts####

--excludedocs if you want no manuals
%packages --nobase --ignoremissing
@core --nodefaults
####packeages####

%end

%addon com_redhat_kdump --enable --reserve-mb= 'auto'

%end

%post
#Tune Linux vm.dirty_background_bytes
echo "vm.dirty_background_bytes=100000000" >> /etc/sysct1.conf epel
cd /root
rpm --import ???
curl ??? -O
rpm -ivh epel -release-7-10.noarch.rpm
yum install -y open-vm-tools ipadmin key
???

# root key
???

centrify partial install
cd /tmp
```

```
curl ??? -O
tar -xvf centrifyRHEL.tgz
./install.sh --express --no_os_check

# Create MOTD OTTR Stamp
mv /etc/motd /etc/motd-backup
cat << MOTD > /etc/motd
OTTR Built: ( ####date#### )
MOTD
# MOTD symlinks
echo "Creating /etc/motd symlinks"
ln -sf /etc/motd /etc/issue
ln -sf /etc/motd /etc/issue.net network
nic=$(ls /sys/class/net/ | grep -v lo)

echo 'GATEWAY=####gateway####' >> /etc/sysconfig/network
echo $'TYPE=Ethernet
BOOTPROTO=none
IPV4_FAILURE_FATAL=no
IPV6INIT=no
ONBOOT=yes
IPADDR=####ipaddr####
NETMASK=####netmask####
GATEWAY=####gateway####
DNS1=####dns####
' > /etc/sysconfig/network-scripts/ifcfg-$nic
echo "NAME=$nic" >> /etc/sysconfig/network-scripts/ifcfg- $nic
echo "DEVICE=$nic" >> /etc/sysconfig/network-scripts/ifcfg- $nic
echo "ZONE=public" >> /etc/sysconfig/network-scripts/ifcfg- $nic set hostname & resolve
hostname ####hostname####.####domain####
echo "####hostname####.####domain####" > /etc/hostname
echo "####ipaddr#### ####hostname####.####domain#### ####hostname####" >> /etc/hosts
echo $'####dns####\nsearch ####domain####' > /etc/resolv.conf
echo "HOSTNAME=####hostname####.####domain####" >> /etc/sysconfig/network
```

```
# firewall

Clean UP cat << ENDF > /etc/rc.d/rc.local
!/bin/bash
rm -f /root/*
rm -rf /var/log/anaconda
echo '#!/bin/bash' > /etc/rc.d/rc.local
ENDF
chmod +x /etc/rc.d/rc.local
rm -rf /tmp/*

%end
```

Example PXE Config for a single MAC:

```
DEFAULT menu.c32
TIMEOUT 0
DEFAULT install

LABEL install
  KERNAL http:// #### FQDN ####.com/tftp/####os####/####version####/images/pxeboot/vmlinuz
  APPEND inst.nosave=all inst.geoloc=0 ipv6.disable=1 ip=dhcp ks=http:/ #### FQDN ####.com /generated/ks/####mac####-ks.cfg \
  initrd=http:// #### FQDN ####.com/tftp/####os####/####version####/images/pxeboot/initrd.img quiet
```

NETWORK VIRTUAL INFRASTRUCTURE DEPLOYMENT AND MANAGEMENT

FIELD OF THE INVENTION

The present invention relates generally to the electrical, electronic, and computer arts, and more particularly relates to infrastructure deployment and management in broadband networks and the like.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Conventional network infrastructure management tools often utilize physical and/or virtual compute and storage resources with various methods for deploying, configuring, managing and accessing environments. System deployment is a common feature of these conventional tools; however, current tools are typically narrowly focused to one specific system and can deploy systems for an individual engine but are not capable of parallelism. In addition to current large infrastructure management tools, there are tools that focus on enhancing various parts of infrastructure management such as network, operating system and application configuration and deployment.

SUMMARY OF THE INVENTION

Techniques are provided for network virtual infrastructure deployment and management. In one aspect, an exemplary method for parallel deployment of a plurality of virtual systems in a broadband network includes obtaining an electronic data structure specifying a set of requirements for each of the plurality of virtual systems to be deployed in parallel; parsing the sets of requirements in the electronic data structure to obtain a plurality of virtual system creation instruction files, one for each of the virtual systems to be deployed in parallel; and executing a plurality of threads in parallel, one for each of the virtual systems to be deployed in parallel, in accordance with the plurality of virtual system creation instruction files, to build the plurality of virtual systems.

In another aspect, an exemplary apparatus for parallel deployment of a plurality of virtual systems in a broadband network includes an installation framework; a boot template server coupled to the installation framework; and at least one virtualization platform coupled to the installation framework. the installation framework obtains an electronic data structure specifying a set of requirements for each of the plurality of virtual systems to be deployed in parallel; the installation framework parses the sets of requirements in the electronic data structure to obtain a plurality of virtual system creation instruction files, one for each of the virtual systems to be deployed in parallel; and the installation framework, the boot template server, and the at least one virtualization platform cooperatively execute a plurality of threads in parallel, one for each of the virtual systems to be deployed in parallel, in accordance with the plurality of virtual system creation instruction files, to build the plurality of virtual systems.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide faster provisioning by eliminating additional configurations frequently required post-deployment. In a non-limiting example, a six-fold increase in efficiency is noted in experiments using this tool over traditional deployment methods (gains could be greater or lesser in other embodiments). The combination of techniques in one or more embodiments of the present invention provide for comprehensive, end-to-end deployment. This solution also reduces rebuilds due to human error by automation.

These and other features and advantages of the present invention will become apparent from the following detailed description of illustrative embodiments thereof, which is to be read in connection with the accompanying drawings.

BRIEF DESCRIPTION OF THE DRAWINGS

FIG. 18, show an exemplary data flow diagram/block diagram/flow chart for a framework that allows a plurality of virtual machines (VMs) to be built in parallel via a multi-threaded approach, with nearly unlimited customization, according to an aspect of the invention;

FIG. 19 shows servers utilized for Preboot Execution Environment (PXE) VM deployment and dependent services, according to an aspect of the invention;

FIG. 20 shows a sample operating system inventory with various distributions and versions displayed as local devices, according to an aspect of the invention;

FIGS. 21A and 21B show the RedHat Enterprise CentOS KickStart template, used for operating system installation and configuration, according to an aspect of the invention;

FIG. 23 shows an exemplary host status report, according to an aspect of the invention.

DETAILED DESCRIPTION OF PREFERRED EMBODIMENTS

Figure 1:
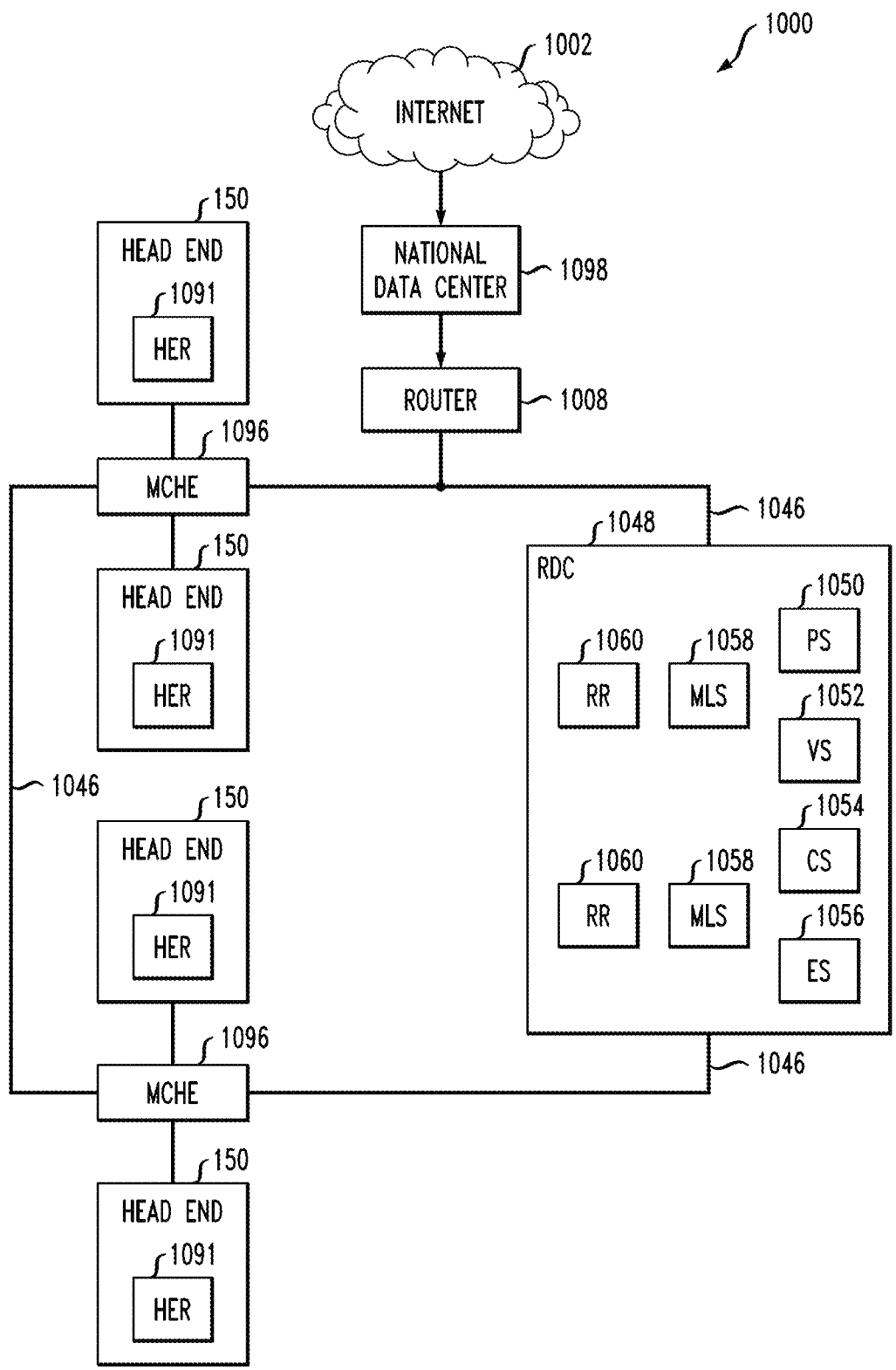
FIG. 1 is a block diagram of an exemplary embodiment of a system, within which one or more aspects of the invention can be implemented.

IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
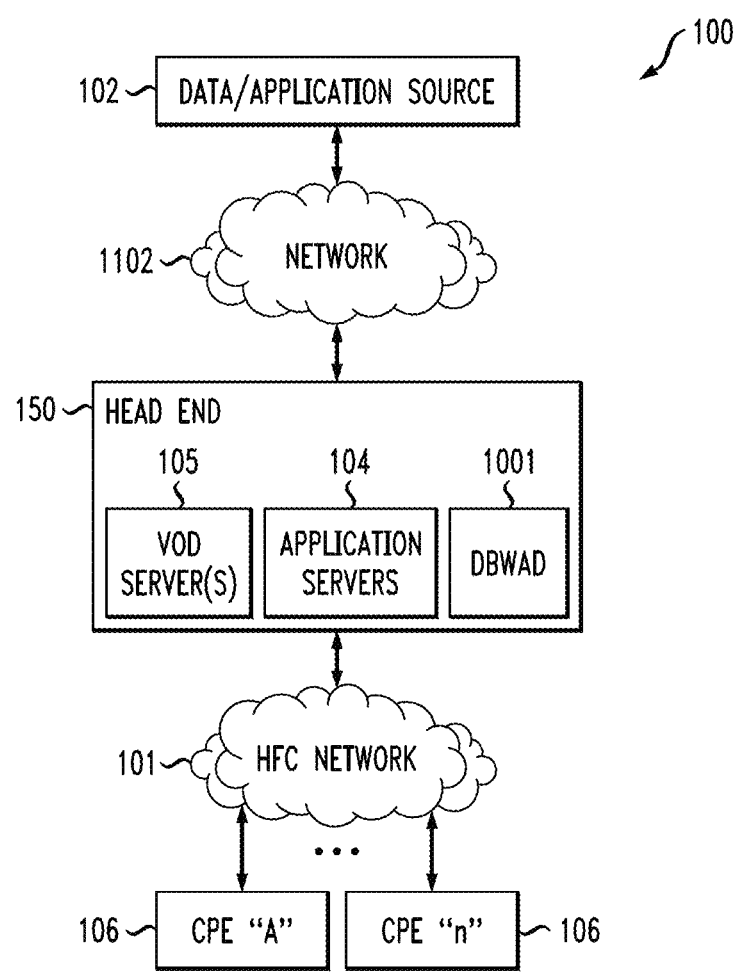
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
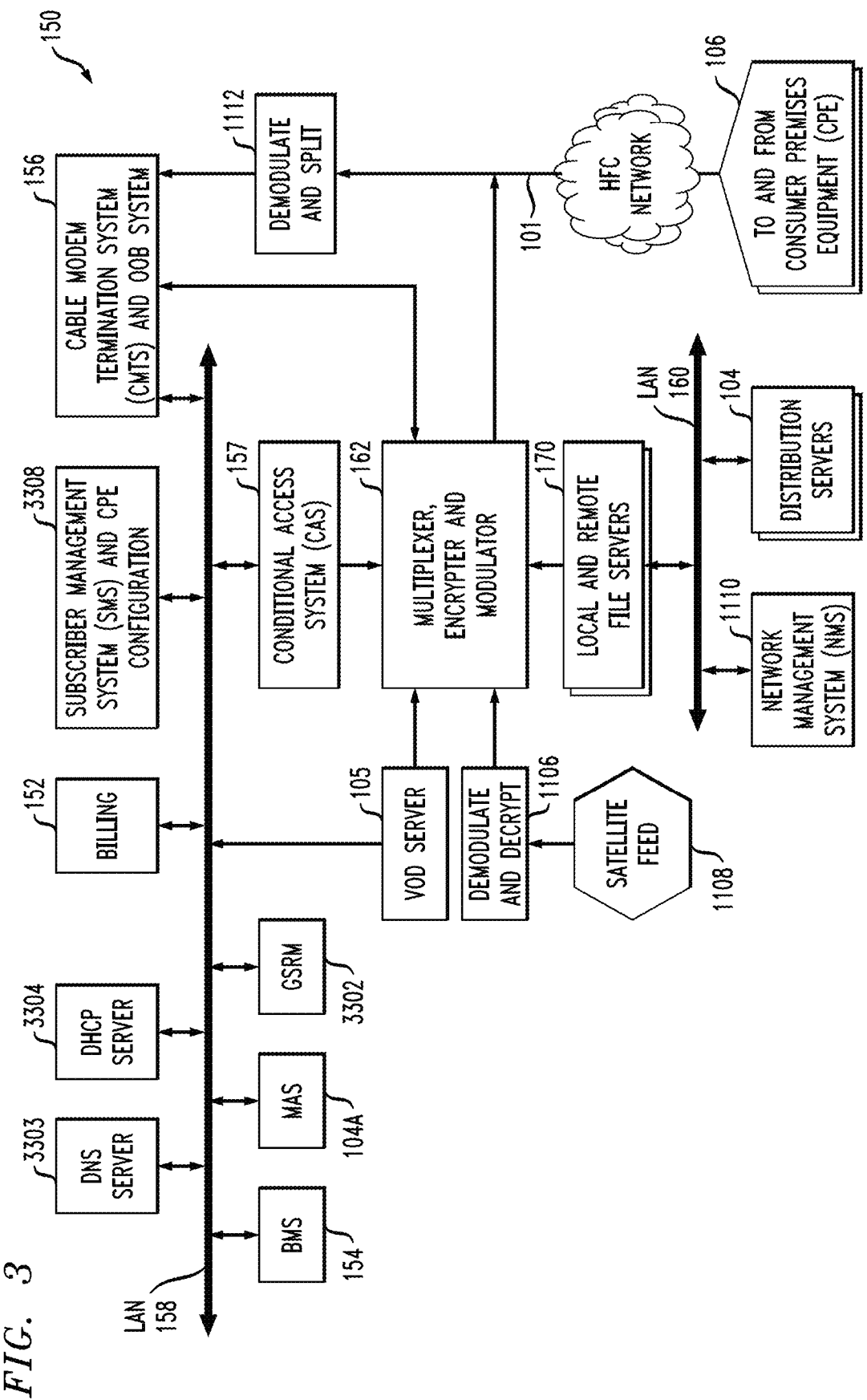
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations. For example, in some instances, DNS and DHCP services are outside of the headend, within a local network.

Figure 4:
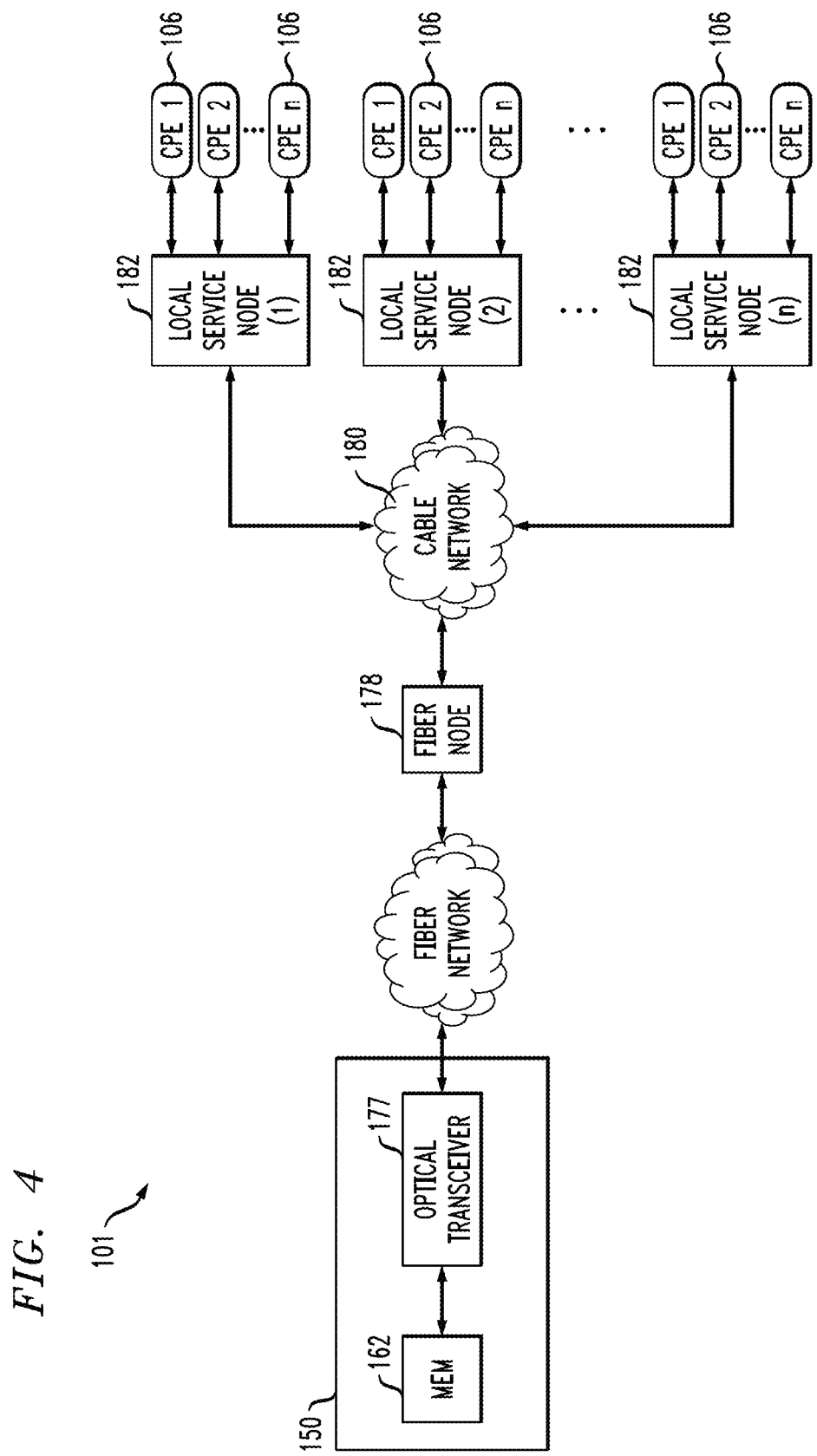
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
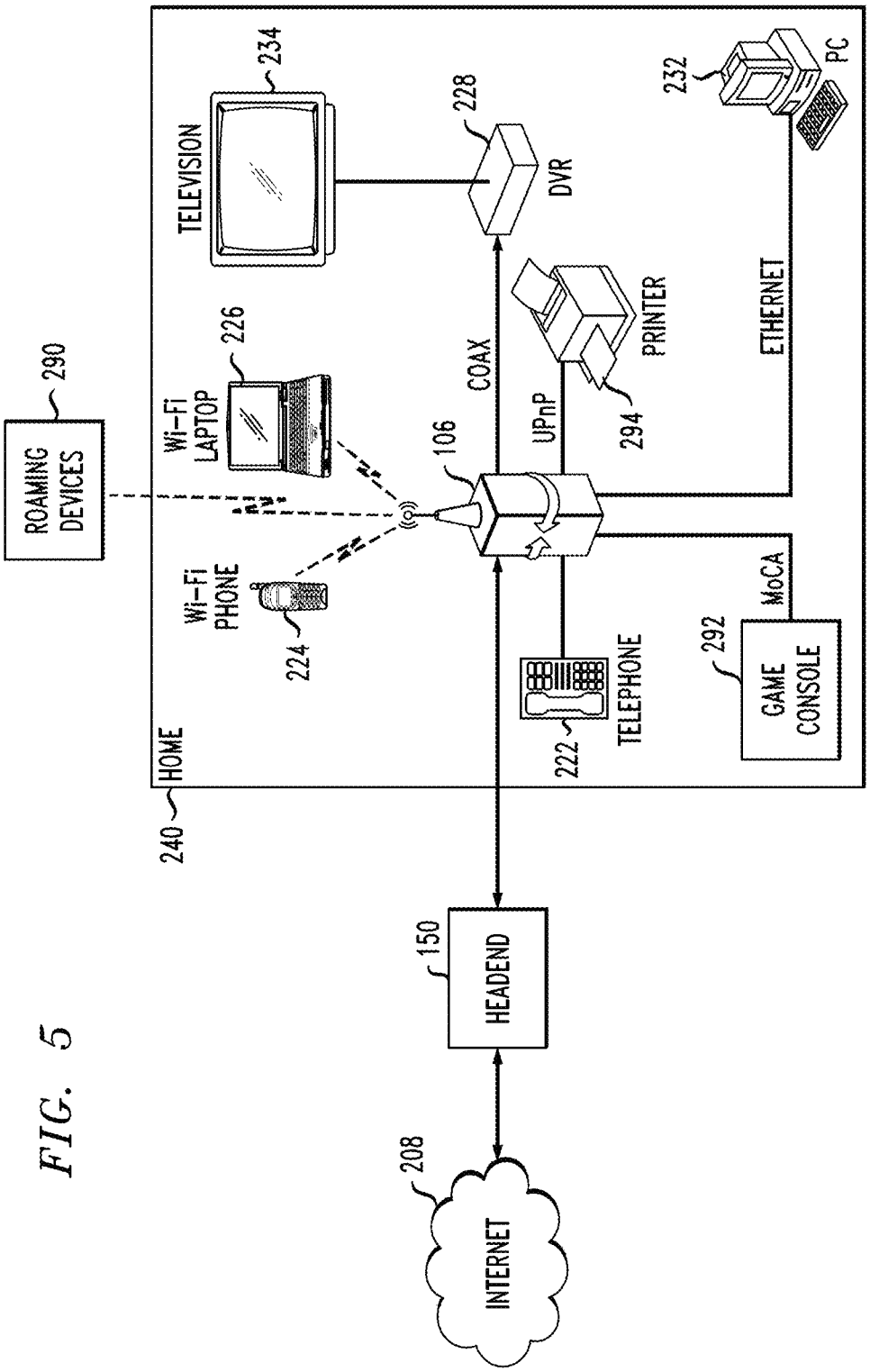
FIG. 5 is a functional block diagram of a premises network, including an exemplary centralized customer premises equipment (CPE) unit, interfacing with a head end such as that of FIG. 3.
Figure 6:
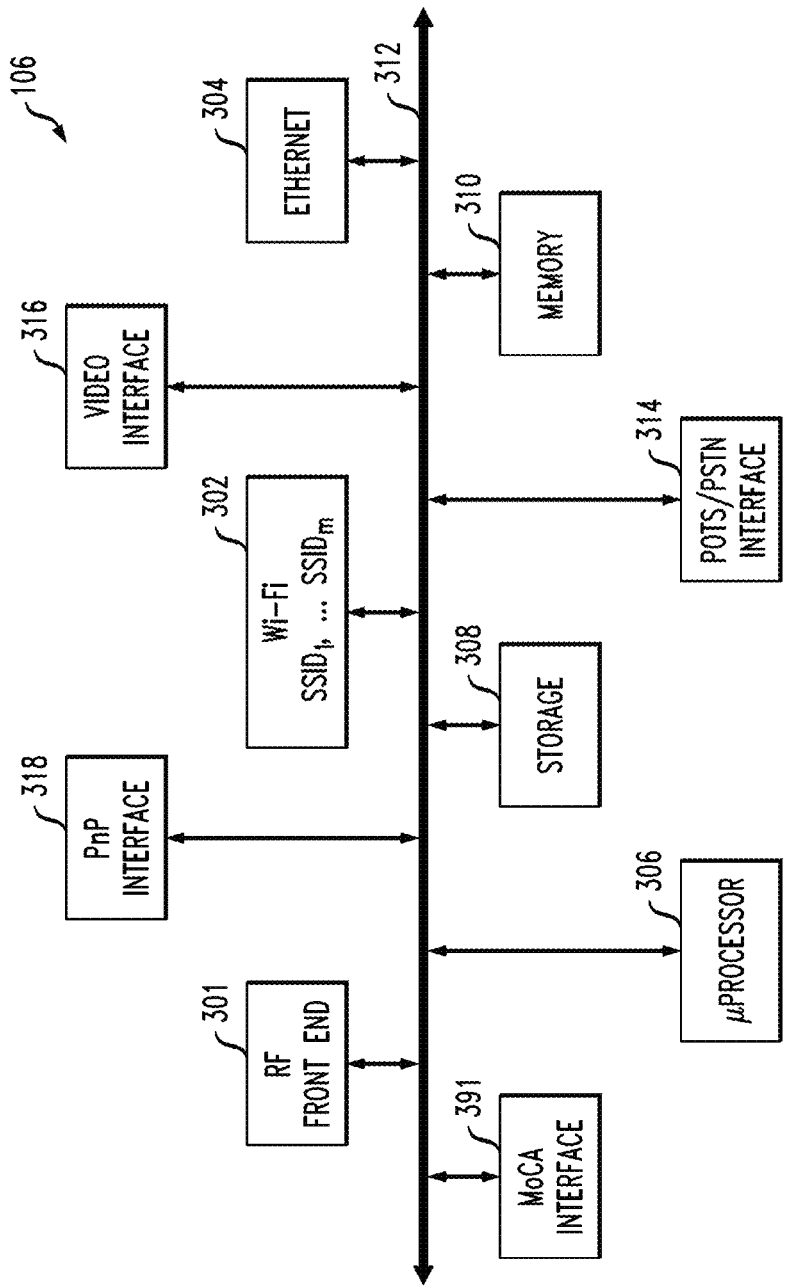
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
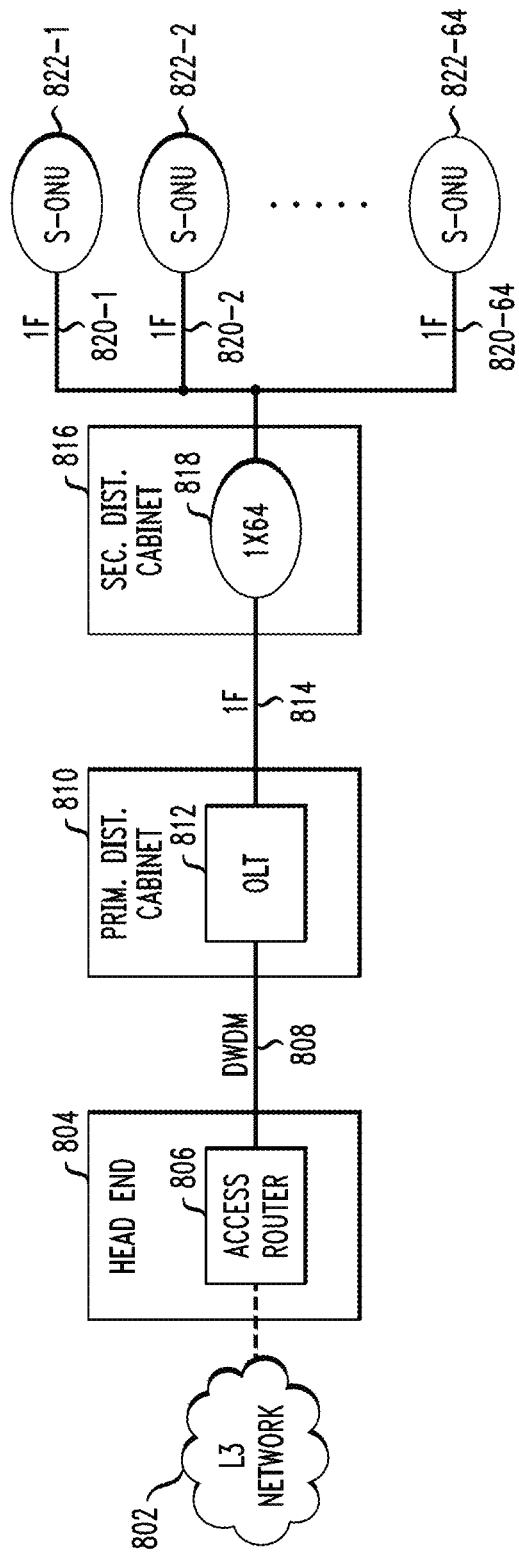
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
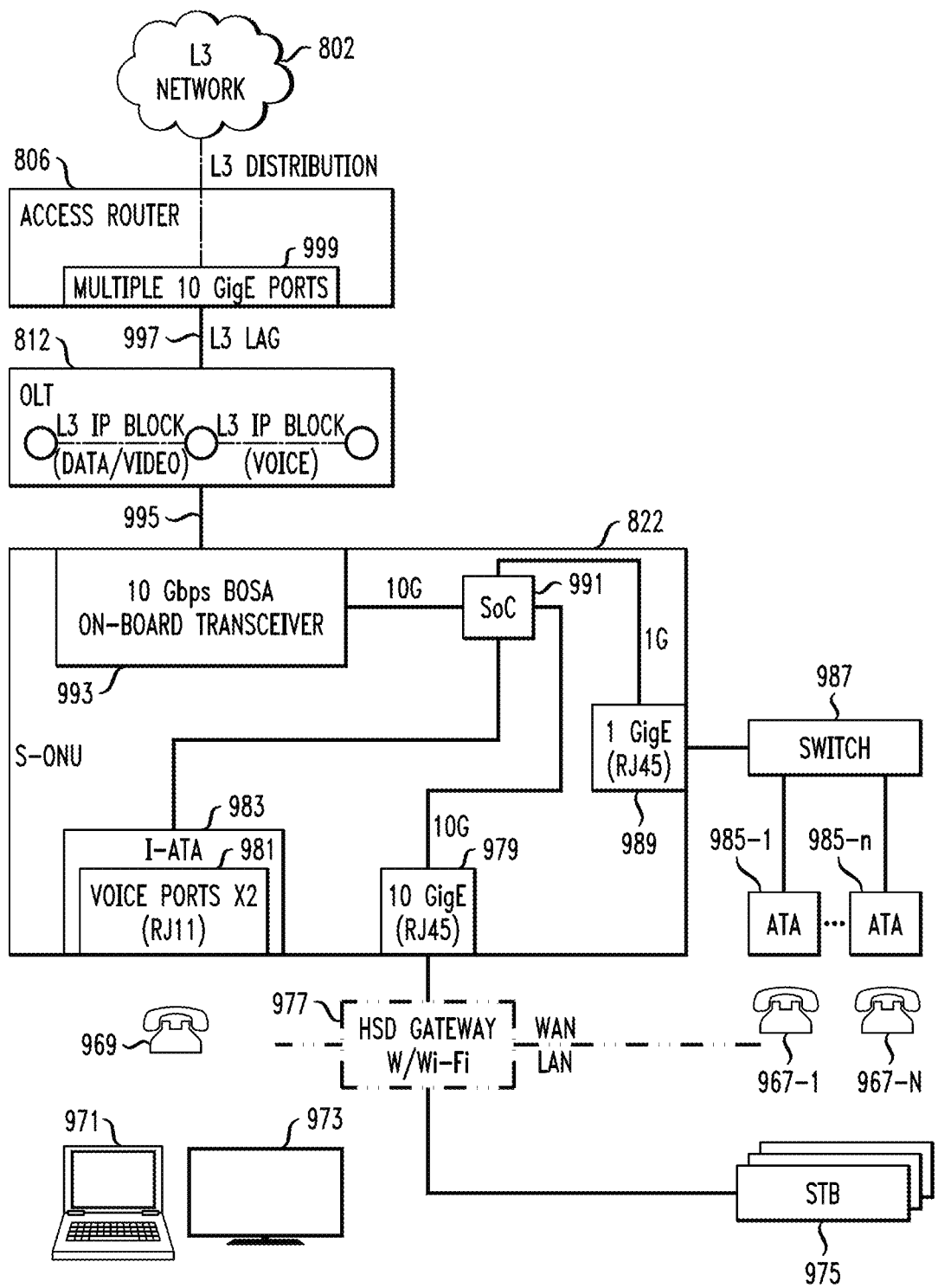
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Aspects of the invention relate to infrastructure management systems, including automated virtual environment deployment and delivery systems. Aspects of the invention also relate to systems handling end-to-end infrastructure builds, by providing an interface for collecting and organizing system requirements, tracking build requests and status, deploying systems efficiently and semi-automatically, and delivering systems effectively.

As noted, conventional infrastructure management tools often utilize physical and/or virtual compute and storage resources with various methods for deploying, configuring, managing and accessing environments. System deployment is a common feature of these conventional tools; however, current tools are typically narrowly focused to one specific system and can deploy systems for an individual engine but are not capable of parallelism. In addition to these large infrastructure management tools, there are tools that focus on enhancing various parts of infrastructure management.

One or more embodiments advantageously provide a virtual environment deployment and delivery system. Non-limiting exemplary embodiments will be referred to herein as "Orchestrate, Test, Transform, Release" ("OTTR"). In one or more embodiments, OTTR provides efficient virtual infrastructure deployment and management for entities such as multi-service operators (MSOs). In one or more embodiments, OTTR provides a central interface to a diverse set of automated tools which, together, enable rapid virtual system deployment and accessible resource management.

One pertinent aspect of OTTR is referred to herein as "OTTR Constructor"; embodiments of OTTR Constructor allow MSO system administrators and their supported tenants to rapidly deploy and discharge virtual environments without direct access to critical backend systems. System requirements are efficiently retrieved, stored and submitted for approval. Once approval has been granted, virtual systems are deployed, configured and delivered. Once virtual systems have been deployed using embodiments of OTTR Constructor, they can also be de-provisioned using the tool.

Heretofore, virtual system deployments have been executed manually due to incompatible system integration. Indeed, currently, there are typically no standards for requirement acquisition and approval, which frequently adds weeks to the deployment process. IP addresses are currently allocated manually, adding time and increasing the possibility of human error. Virtual systems are typically deployed manually, often through a third party virtual infrastructure management system. System-level configurations, such as networking, disk partitioning, application and backup solution, are also typically performed manually. Due to an entirely manual process, multi-system virtual deployments often take multiple weeks to complete.

Embodiments of OTTR Constructor provide an automated solution that efficiently delivers end-to-end virtual system deployments and provides a solution for deallocating systems and their resources. In a non-limiting exemplary embodiment, OTTR Constructor is divided into two major functionalities: Provision and Deprovision. The Provision functionality is utilized for the entire end-to-end virtual system deployment process, including requirement acquisition and management, networking requirement allocation, virtual system production and configuration, and deployment delivery. The Deprovision functionality is utilized for deallocating virtual environments and their resources when they are no longer needed. Deprovision functionality includes retrieving virtual system specifications, deallocating network configurations and completely removing associated resources. Together, these two major capabilities enable embodiments of OTTR Constructor to effectively facilitate the virtual system stand-up and tear-down process.

OTTR Constructor Provision functionality, in one or more embodiments, retrieves and stores virtual system requirements. Once requirements are submitted and approved, the system creates status-tracking tickets for applicable deployment updates. Then, the system deploys, configures and validates virtual systems corresponding with initial requirement specifications. Finally, upon successful deployment, the system delivers new virtual deployments and updates tracking tickets.

Together, the processes mentioned above advantageously provide a comprehensive, effective and authentic process for end-to-end virtual system deployments. In one or more embodiments, the extensive process performed by OTTR Constructor Provision is segmented into five general, collaborative operations:
1. Requirements Collection
2. Build Preparation
3. Deployment
4. Validation
5. Release OTTR Constructor Provision functionality, in one or more embodiments, captures and organizes system requirements for virtual infrastructure builds and stores them in a JavaScript Object Notation (JSON) object. This standardized and transferable JSON object is imported into OTTR Constructor where the build requirements are parsed and delegated to OTTR Constructor Provision worker threads for build. The worker threads are responsible for provisioning virtual resources such as DNS IP addresses, CPU, memory, network access, disk space, as well as operating system installation, configuration, and backup.

Embodiments of OTTR Constructor Deprovision functionality provide techniques for deprovisioning, and in some cases destroying, virtual containers and resources built by OTTR Constructor. OTTR Constructor Deprovision deallocates virtual environments and their associated virtual resources. Virtual resources may include, for example, operating systems, virtually-contained applications and their virtual allocated memory, virtually-allocated CPU, and virtual disk/hard drive space. In a non-limiting example, the extensive process performed by OTTR Constructor Deprovision is broken down into 4 pertinent phases:
1. Request Collection
2. Deprovision Preparation
3. Deprovision
4. Release The first phase of the deprovisioning process is request collection. An authenticated user provides an existing virtual build unique ID via the request form. Once the request is submitted, it is stored in the backend system for tracking and processing.

The second phase, Deprovision Preparation, initiates the process by updating the internal tracking ticket with the deprovision request. The system will perform an authorization task to verify that the specific user requesting the deprovision of the build has sufficient permission. If the user does not have sufficient permission, the system will not continue to process the deprovision request, but instead will update the deprovision status as Incomplete on the tracking ticket. If the user is authorized to perform the deprovision action, the deprovision request will continue.

The third phase, Deprovision, handles the task of deprovisioning and destroying virtual resources. The system first gathers all of the resources for the build's unique identifier and initiates a request to deallocate associated IP addresses and destroy all associated "A" records in the DNS system. The system then destroys all virtual containers associated with the build and releases their virtual CPU and virtual memory, and deletes and releases the associated disk space.

If the deprovision phase fails, the system updates the deprovision status as incomplete and updates the tracking ticket. If the deprovision phase is successful, the system updates the build deprovision status as complete and updates the tracking system.

Figure 10:
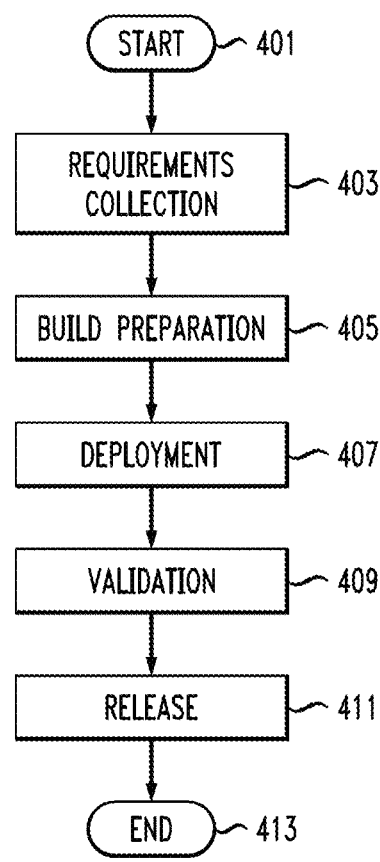
FIG. 10 presents a high-level view of an exemplary OTTR Constructor Provision process, according to an aspect of the invention.

FIG. 10 illustrates a high-level overview of an exemplary five-step OTTR Constructor Provision process. After beginning at 401, step 403 includes the Requirements Collection phase which will be described in greater detail in the detailed descriptions for FIGS. 11-13. Step 405 includes the Build Preparation phase which will be described in greater detail in the detailed descriptions for FIGS. 11 and 14. Step 407 includes the Deployment phase which will be described in greater detail in the detailed descriptions for FIGS. 11 and 15. Step 409 includes the Validation phase which will be described in greater detail in the detailed descriptions for FIGS. 11 and 16. Finally, step 411 includes the Release phase which will be described in greater detail in the detailed description for FIG. 11. Processing completes at 413.

Figure 11:
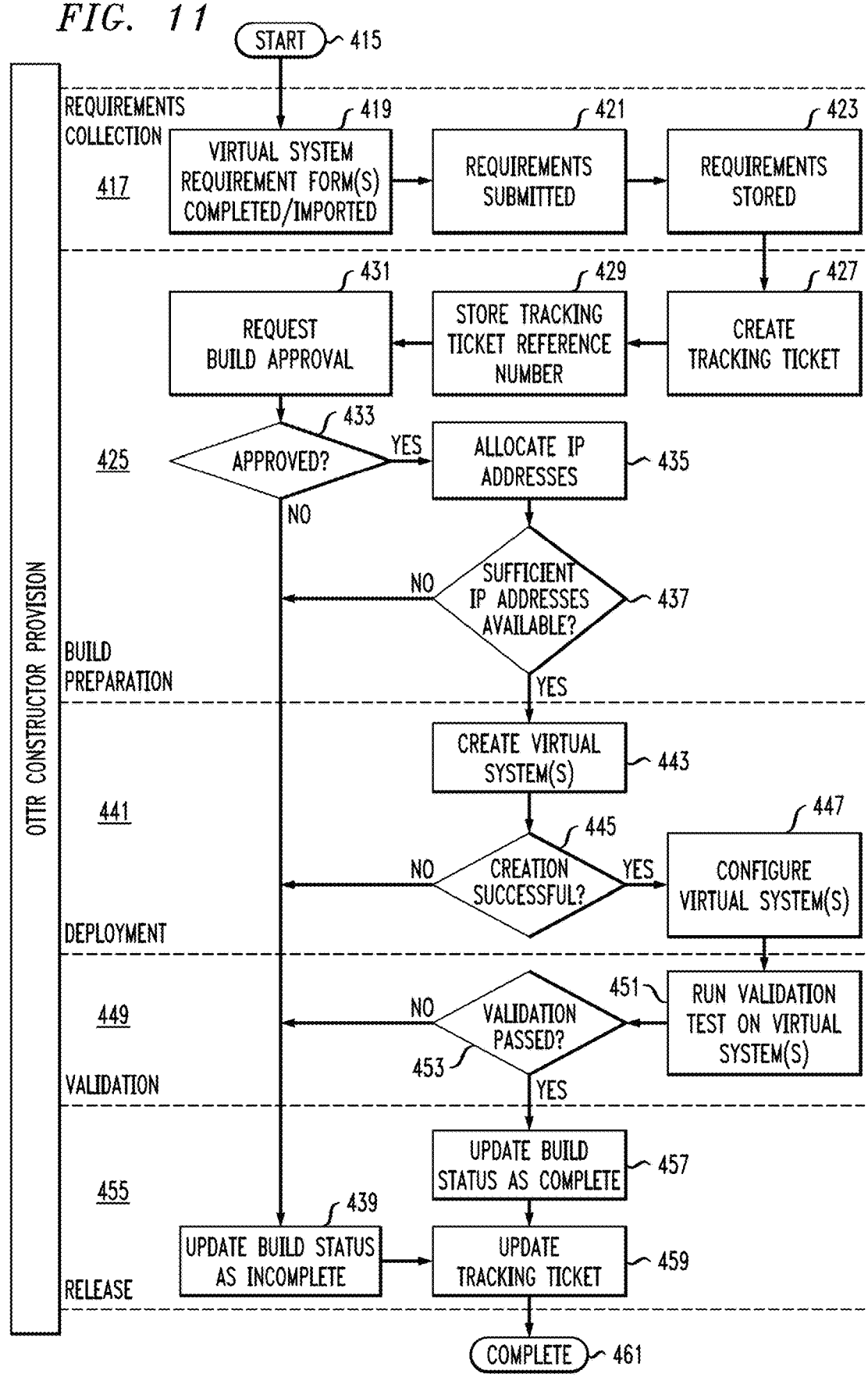
FIG. 11 illustrates an in-depth workflow diagram of an exemplary OTTR Constructor Provision process, according to an aspect of the invention.

FIG. 11 illustrates an in-depth workflow diagram of the end-to-end OTTR Constructor Provision virtual system deployment process, demonstrating each of five pertinent steps and their functionality. At 415, the process begins in the Requirements Collection phase 417 where virtual system requirements are received in the OTTR Constructor JSON object format at 419, 421 (see FIG. 12) and stored at 423 for utilization within following phases. Although requirement retrieval and storage is a pertinent step of the OTTR Constructor process, the specific methods for retrieving and storing requirements may vary. The Requirements Collection phase 417 is described with greater detail in the detailed description for FIGS. 12 and 13.

Once requirements are received and stored, the OTTR Constructor Provision system enters the Build Preparation phase 425. This phase includes the creation of a tracking ticket at 427 and storing the associated reference number for later use at 429. Following step 429, build approval is requested at 431 and if approved in decision block 433, IP addresses are appropriately allocated during this phase at 435 to progress to the Deployment and Validation phases (assuming sufficient IP addresses are available as determined in decision block 437, YES branch). The Build Preparation phase is described in greater detail in the detailed description for FIG. 14. If either decision block 433 or 437 yields a NO, proceed to block 439.

Once the Build Preparation phase is complete, the Deployment phase 441 should typically be initiated. The methods for initiating a deployment vary but include web interface, command-line initiation, etc.

The Deployment phase includes the actions of creating and configuring all virtual systems, following the initial system requirements provided in the Requirement Collection phase. In particular, create the virtual systems in block 443; if successful as per the "yes" branch of decision block 445, configure the virtual systems in block 447; else proceed to block 439. The Deployment phase is described in greater depth in the detailed description of FIG. 15.

If all virtual systems have been created successfully, the OTTR Constructor Provision system will, then, enter the Validation phase 449. The Validation phase 449 includes the processes 451, 453 for testing and confirming successful virtual system deployments and configurations. The Validation phase is described in greater depth in the detailed description for FIG. 16. Once the Validation phase is completed (YES branch of decision block 453), or skipped (NO branch of decision block 453 to block 439) if virtual systems were unsuccessfully created in the Deployment phase, the OTTR Constructor Provision system enters the Release phase 455. This phase requires update of the build status at 457 and update of the tracking ticket at 459 using the stored reference number (described in the Build Preparation phase at 425, 429). Build status may be updated using methods similar to those used for storing requirements and reference numbers or using various other methods deemed applicable by the skilled artisan, given the teachings herein. The logical flow is complete at 461.

The process and implementation of updating the tracking ticket will vary. In one or more embodiments, it will be useful to update tracking tickets with information such as initial virtual system requirements, IP addresses allocated, build status, etc. Completion of the previously described phases from FIG. 11 fulfills the OTTR Constructor Provision process requirements of end-to-end virtual system deployment. Although specifications and technologies may vary, in one or more embodiments, the end-to-end deployment process and its required steps for fulfillment are precise. That is to say, in one or more embodiments, the requirements intake process is standardized, but the tools for fulfillment are pluggable—the system is not constrained to tools of any specific vendor. Rather, given the teachings herein, the skilled artisan will be able to implement aspects of the invention by adapting tools from a variety of vendors, such as, for example, AWS (Amazon Web Services), vCenter (from VMware, Inc. Palo Alto, Calif., USA), Azure (from Microsoft Corporation, Redmond, Wash., USA), and the like.

Figure 12:
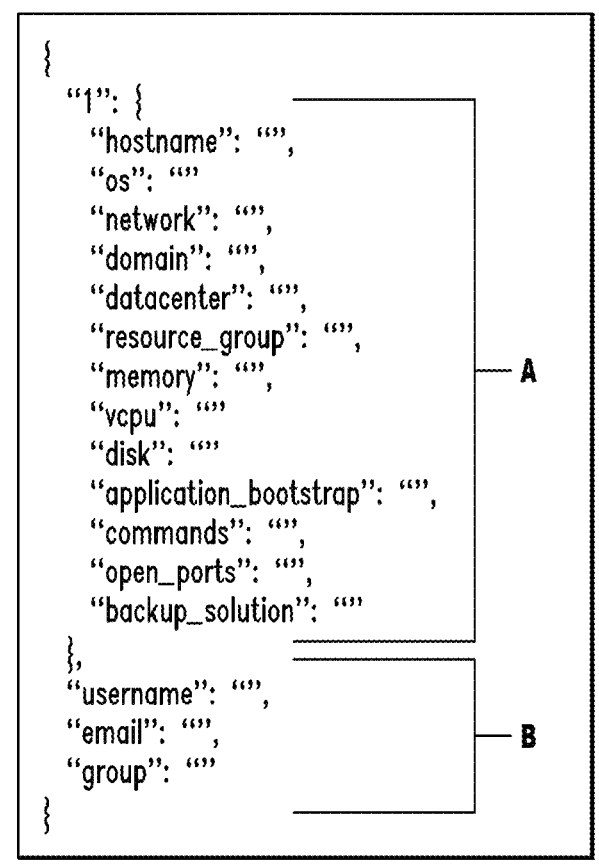
FIG. 12 illustrates exemplary format and fields of an OTTR Constructor JSON object used to store, transfer and implement virtual system requirements, according to an aspect of the invention.

FIG. 12 displays the architecture of the OTTR Constructor JSON object used for storing virtual system requirements. Embodiments of the invention are broadly applicable to any way of obtaining the requirements. Given the teachings herein, the skilled artisan will be able to determine many different ways of obtaining requirements. Examples of requirement collection methods include, but are not limited to: internally-developed web application forms, requirement collection wizards, third-party application forms, etc. Section A depicts the requirements for a single, virtual system. To deploy multiple virtual systems simultaneously, an additional JSON object can be inserted between Section A and Section B for each additional virtual system. The dictionary key, which is currently "1" for the first virtual system, should be incremented with each additional virtual system. Section A includes descriptors used to create and configure virtual systems using the OTTR Constructor process. Other conventions can be used in other embodiments, depending on the implementer's environment, associated technologies and preferred methods. The OTTR Constructor method uses the "hostname" field (Section A) for mapping hostname to IP address within the environmentally-subjective IP address management (IPAM). The "hostname" field is also used to uniquely name the virtual system within the environmentally-subjective infrastructure management application. Additionally, "hostname" is used for configuring the virtual system's local hostname during the configuration process. The "os" field (Section A) is used to identify the operating system distribution and version for the virtual system. Like the other JSON fields, "os" is subjective (i.e. any suitable operating system can be used) and can be used to identify pre-created virtual machine templates, standardized system images, and other operating system identifiers that are applicable to the implementor's environment.

The "network", "datacenter" and "resource_group" fields (Section A) are used to define where the virtual system should be located within the implementor's environment. These fields can be used to specify network range (e.g. private or public network), physical or logical environment location, resource groupings, and the like, as will be apparent to the skilled artisan, given the disclosure herein. These fields may be omitted if they are deemed by the implementor as unnecessary. The "domain" field (Section A) is used for created the environmentally-subjective IPAM entry. This field is also used for locally configuring the virtual system's fully qualified domain name (FQDN) during the configuration process. The "memory", "vcpu" and "disk" fields (Section A) are used during the virtual system creation process for provisioning the required resources (memory, virtual CPU, disk storage). Additionally, the "disk" field is used to configure the virtual system's logical partitioning during the configuration process. The "application_bootstrap" field (Section A) is used to specify configuration methods that should be implemented during the configuration process. Configuration methods, whether internally-developed, or a utilized-third party, can be determined by the skilled artisan, given the disclosure herein. This field may be omitted if no additional configuration methods are required. The "commands" field (Section A) is used to specify system commands that should be executed during the configuration process. Usage includes installing packages, creating users, additional configuration commands, and the like. If additional post commands are not required, this field may be omitted. The "open_ports" field (Section A) is used to specify ports that should be opened for connections during the configuration process. Additionally, this field can be used to specify firewall requirements and the like. This field can be omitted if identified unnecessary by the implementor and/or requestor.

The "backup_solution" field (Section A) can be used to identify methods for backing up the virtual system and its data. The specific backup method can be third-party provided, internally developed, or omitted if deemed unnecessary, as will be appreciated by the skilled artisan, given the disclosure herein.

Section B includes the requirement-submitter's information. In one or more embodiments, this section is implemented only once, regardless of the number of virtual systems required. The "username" and "email" fields (Section B) may be used for resource tracking, permission assignment, status updates, and the like. The "group" field (Section B) may be used for grouped resource tracking, grouped permission assignment, multi-party updates, and the like.

Figure 13:
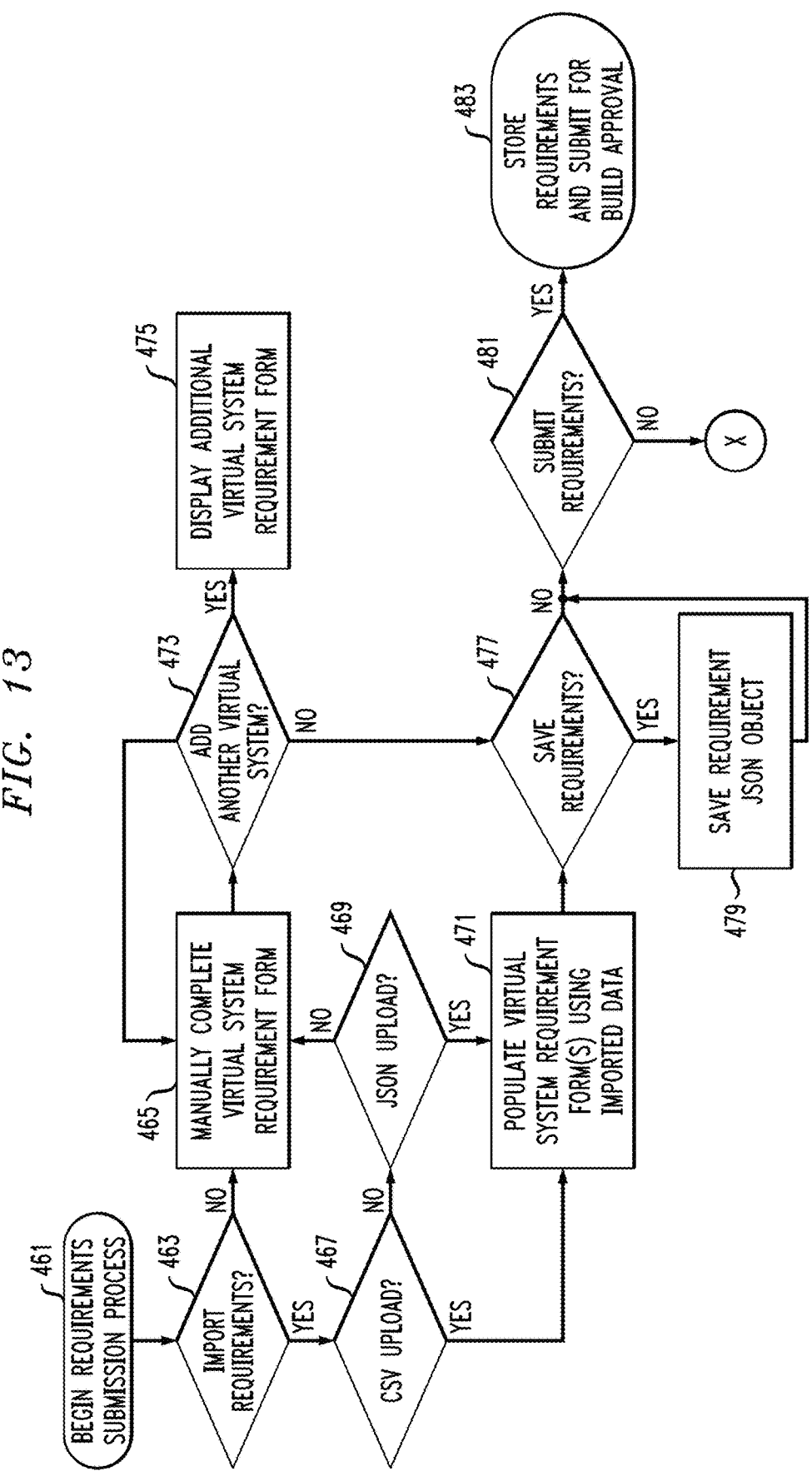
FIG. 13 illustrates a workflow diagram of an exemplary Requirements Collection phase, according to an aspect of the invention.

FIG. 13 illustrates the Requirement Collection phase, where virtual system requirements (described in detail in FIG. 12) are retrieved and submitted. If the virtual system requirements are being submitted by a standard user, e.g. tenant, system administrator, etc., a pre-requisite to this stage, in one or more embodiments, is to ensure that the user has authenticated (via whichever authentication system is implemented in the applicable environment). This process begins at 461 with the ability to import virtual system requirements. Methods for import vary but include uploading a previously-constructed JSON object, meeting the requirements of the OTTR Constructor JSON object (described in FIG. 12) or uploading a CSV file and converting its fields to an OTTR Constructor JSON object. If the submitter chooses to import a JSON object or CSV file, as per the YES branch of decision block 463, a virtual system requirement form will be populated from the imported data for each virtual system being deployed. If the submitter chooses not to import a JSON object or CSV file (NO branch of 463), the user is to manually complete the virtual system requirement form at 465 (containing the fields described for the OTTR Constructor JSON object in FIG. 12). For each additional virtual system being deployed, an additional virtual system requirement form will be displayed and completed by the submitter, as at 473 (YES branch) and 475.

The logic of decision blocks 467, 469 leads to block 471, where virtual system requirement forms are populated using the imported data (JSON or CSV); if neither a CSV nor a JSON file is uploaded, logical flow proceeds to the manual block 465.

Once the virtual system requirements form(s) have been completed (manually or by upload), the submitter should be granted the opportunity to save his or her system requirements, as per decision block 477. This feature is desirable for extensibility and the capability of importing requirements. Methods for locally storing requirements vary but include a downloadable CSV file, JSON object (as at 479), etc. The next step is to submit the system requirements. If the submitter chooses not to submit (NO branch of 481), the requirements are not required to be stored via the OTTR Constructor Provision system ("X"). If the submitter submits the requirements (YES branch of 481), they are then passed, at 483, to the Build Preparation phase where they are later stored and utilized.

Figure 14:
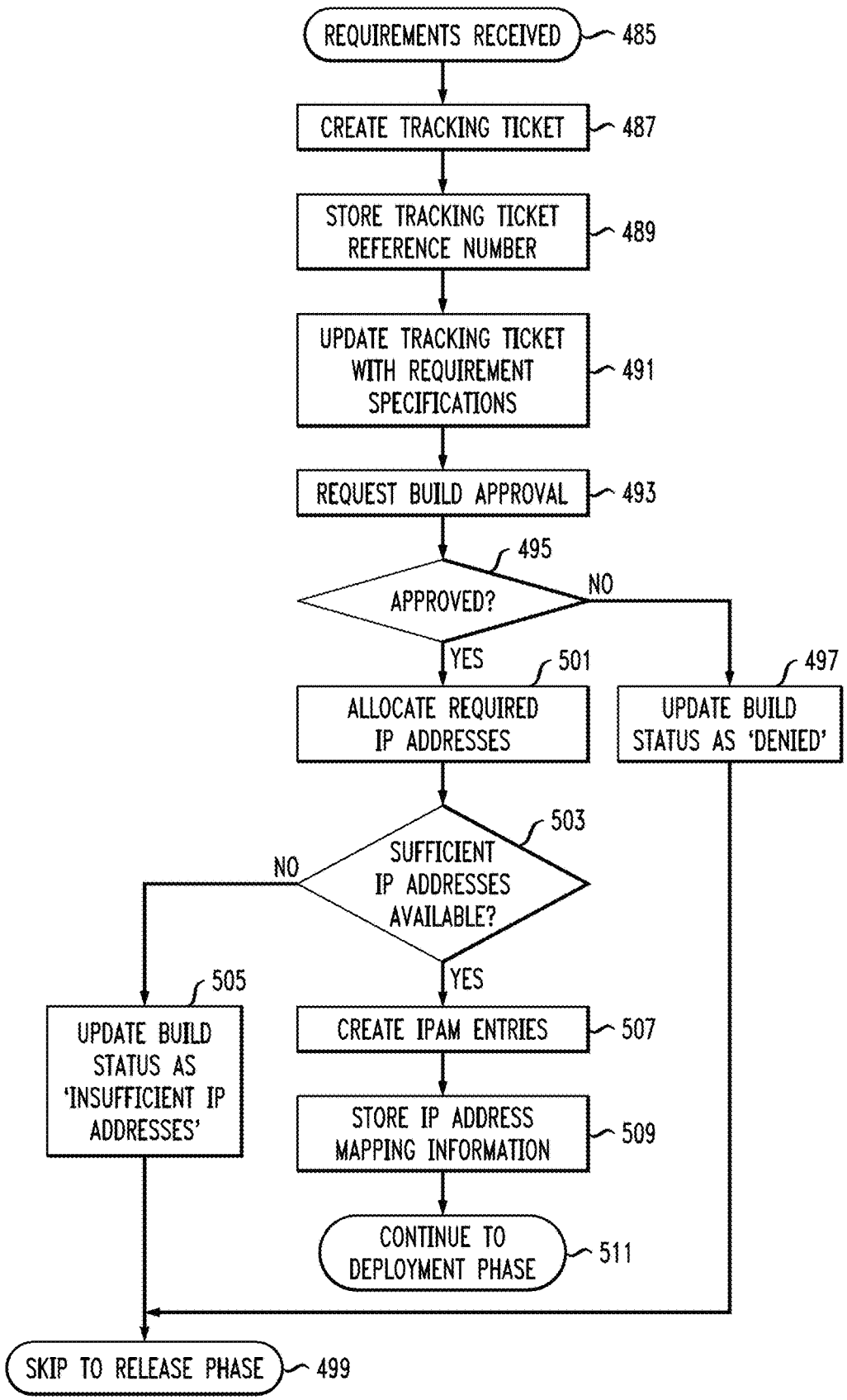
FIG. 14 illustrates a workflow diagram of an exemplary Build Preparation phase, according to an aspect of the invention.

FIG. 14 illustrates the Build Preparation phase. A prerequisite 485 to this phase is that system requirements have been submitted following the Requirement Collection phase, previously described in FIG. 13. Once requirements are received and stored, the OTTR Constructor Provision system creates a tracking ticket at 487, through the third-party or internally-developed tracking system chosen by the implementor. Suitable methods and technologies for tracking deployment progress will be apparent to the skilled artisan, given the teachings herein. The reference number of the tracking ticket should be stored at 489, using a suitable storage method (suitable methods will be apparent to the skilled artisan, given the teachings herein). The tracking ticket reference number will be used later in the Release phase for updating virtual system deployment status and details; note update step 491. After the tracking ticket is stored, deployment (build) approval should be requested via a suitable method (suitable methods will be apparent to the skilled artisan, given the teachings herein), as at 493. The requirement of build approval by an authorized party is often used as a precautionary resource-control measure. However, if deemed unnecessary by the implementor, this requirement of build approval may be omitted. The methods used for obtaining approval include, but are not limited to, web interface, third party forms, e-mail confirmation, and other automated or manual methods as will be apparent to the skilled artisan, given the teachings herein. Techniques for determining authorized parties are also left at the discretion of the implementor.

If a deployment has been denied by an authorized party, as per the NO branch of 495, the build status is updated as DENIED at 497, and the OTTR Constructor Provision system should skip to the Release phase (described in the detailed description for FIG. 11), as per 499. Once a deployment has been approved (YES branch of 495), the necessary IP addresses, following the initial system requirements, are allocated at 501. The IPAM system of choice and its methods for automation may vary. However, the IP addresses retrieved and DNS entries configured will satisfy the "hostname", "network" and "domain" requirements specified in the OTTR Constructor JSON object (FIG. 12 Section A). Given the teachings herein, the skilled artisan will be able to determine IP addressing requirements, specifications and the implementation for IPAM automation and integration prior to deploying virtual systems. If insufficient IP addresses are available (NO branch of 503), the OTTR Constructor Provision system updates the build status as INSUFFICIENT IP ADDRESSES at 505 and skips to the Release phase. If sufficient IP addresses are found (YES branch of 503), IPAM entries are created at 507 via a suitable IPAM system and its available methods. The IP address/virtual system mapping should be stored with the virtual system requirements in 509 for required configuration during the Deployment phase. If sufficient IP addresses are allocated and stored appropriately, the OTTR Constructor Provision process should continue to the Deployment phase, at 511.

Figure 15:
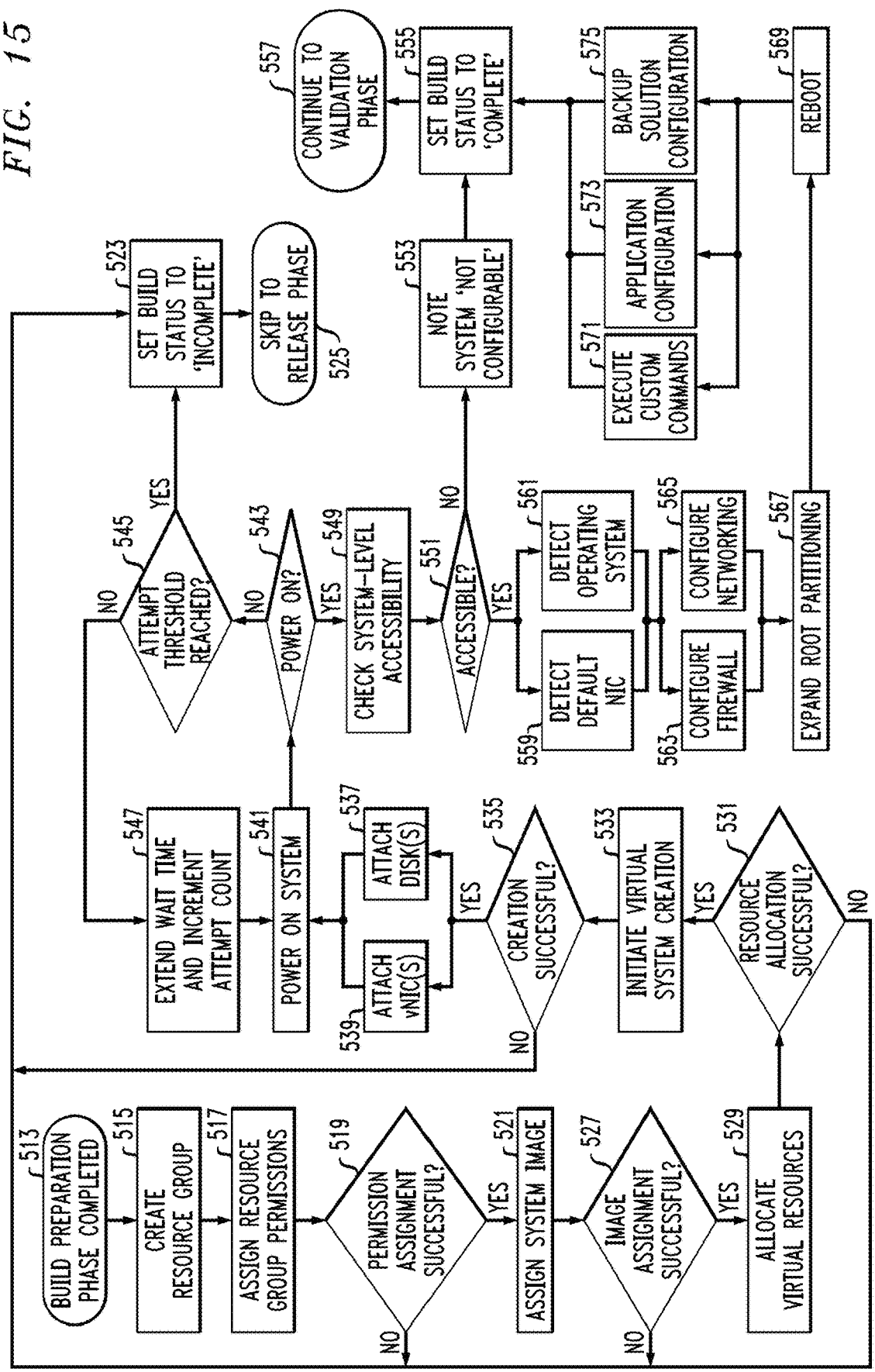
FIG. 15 illustrates a workflow diagram of an exemplary Deployment phase, according to an aspect of the invention.

FIG. 15 illustrates the Deployment phase of the OTTR Constructor Provision process; as indicated at 513, it begins when the build preparation phase is completed. The depicted steps are illustrative in nature and other embodiments can employ alternative approaches; for example, dependent on the infrastructure management system being implemented and its available methods for automation. Additional or alternative configuration methods may be implemented as appropriate. Furthermore, in some embodiments, one or more methods may be omitted if appropriate. The prerequisites for the Deployment phase include proper system requirement collection and storage, allocation of required IP addresses, and the other pertinent actions described in the previous detailed descriptions for the Requirement Collection and Build Preparation phases. The Deployment phase includes two main functionalities in one or more embodiments, virtual system creation and configuration.

The first action of the Deployment phase, at 515, is to create a resource group that will contain the virtual systems and assign the appropriate user permissions to the resource group at 517. Various implementations of resource groupings and permissions will be apparent to the skilled artisan, given the teachings herein. The specific method for storing collections of systems can be selected, for example, based on the virtual infrastructure management system of choice, as can the methods for implementing resource permissions. Section B from FIG. 12 includes necessary information for associating user or group permissions to virtual systems and resource groups. Once resource groups are created and permissions are assigned according to the appropriate conventions (YES branch of 519), the Deployment process will continue to assign a system image for the virtual system being deployed, at 521 (else set build state to INCOMPLETE at 523 and skip to release phase at 525). This assignment will follow the appropriate conventions and constraints of the implementor's environment and should remain consistent with the virtual system requirements acquired during the Requirement Collection phase.

If, as per the NO branch of block 527, the system image assignment fails for reasons including, but not limited to, inability to find the specified image or compatibility constraints, then the OTTR Constructor Provision system should skip the remaining processes, mark the build status as 'incomplete' at 523 and skip to the Release phase at 525. If system image assignment is successful (YES branch of 527), the system should, then, allocate the virtual resources required according to the virtual system requirements submitted during the Requirement Collection phase, at 529.

If, for whatever reason, the system is not able to allocate the required virtual resources (NO branch of 531), then the OTTR Constructor Provision system should skip the remaining processes, mark the build status as 'incomplete' at 523, and skip to the Release phase at 525. Issues that may cause resource allocation to fail may include insufficient resources available, compatibility constraints, etc. Once virtual resources are successfully allocated (YES branch of 531), the virtual system creation should be initiated at 533 via the virtual infrastructure management system methods available.

If the virtual system fails to be created (NO branch of 535), then the OTTR Constructor Provision system should skip the remaining processes, mark the build status as 'incomplete' at 523 and skip to the Release phase at 525.

In one or more embodiments, upon successful creation (YES branch of 535), the following two actions occur simultaneously, using parallel automation techniques, for optimal configuration speeds. The first action 537 is to attach one or multiple storage disks, fulfilling the "disk" requirement (described in FIG. 12 Section A). Appropriate types of attached storage will be apparent to the skilled artisan, given the teachings herein, and may depend, for example, on the virtual infrastructure management system being implemented. The second action 539, preferably occurring simultaneously with the first, is to attach one or multiple virtual Network Interface Cards (vNICs). The attached vNICs will fulfill the network requirements (FIG. 12 Section A) and specific network requirements defined by the implementation environment.

The next step 541 is to power on the virtual system. The OTTR Constructor Provision system should, then, check if the virtual system has powered on successfully, at 543. If the virtual system has not yet powered on, a threshold will be modified and used as a counter, at 545. This threshold should specify a maximum number of power-on attempts deemed acceptable. Given the teachings herein, the skilled artisan will be able to determine appropriate thresholds for given applications. As long as the threshold has not been met (NO branch of 545), the system should continually attempt to power on the system and check the system's power state, as per 547, 541. If the threshold is met before the system has been verified as powered on, as per YES branch of 545, then the OTTR Constructor Provision system should skip the remaining processes, mark the build status as 'incomplete' at 523 and skip to the Release phase 525.

Once the virtual system has been powered on successfully as per the YES branch of decision block 543, the system should confirm whether the virtual system is accessible via virtual infrastructure management system and its methods, at 549, 551. System-level accessibility is required, in one or more embodiments, to configure the virtual system per the OTTR Constructor Provision system. Virtual systems can still be created, without system-level accessibility, but will skip the configuration section of the Deployment phase. If a virtual system does not provide system-level accessibility, the system should be noted as 'Not Configurable' (No branch of 551) at 553, or other appropriate convention. This specification is useful for demonstrating a virtual system that has been automatically created successfully, but was unable to be configured. The build status can then be set to complete at 555, and processing continues to the validation phase at 557.

If system-level accessibility has been confirmed, as per the YES branch of 551, the configuration section of the Deployment phase should begin. The initial two configuration actions 559, 561 occur simultaneously, in one or more embodiments, using parallel automation techniques, for optimal configuration speeds. The first action 561 is the detection of operating system and version. The operating system is detected to ensure proper configuration syntax for configuration commands to follow. The second action 559, simultaneous in one or more embodiments, describes the detection of the default Network Interface Card. The Network Interface Card is detected to ensure proper network configuration of the system, which is typically initiated during the creation process.

After both of the previous steps have completed, the following actions 563, 565 occur simultaneously in one or more embodiments, using parallel automation techniques, for optimal configuration speeds. The first action 565 describes the configuration of networking. The methods for configuring networking on the virtual system may vary, but should follow the initial requirement specifications (described in FIG. 12 Section A) and additional implementation environment network specifications. The network configuration 565 will correspond with the Network Interface Card specifications, detected previously.

The second, simultaneous (in one or more embodiments), action describes the configuration of the system's firewall 563. The methods for firewall configuration will vary but should fulfill the "open_ports" requirement described in FIG. 12 Section A. After both of the previous steps have completed, the next action 567 is to expand the system's root partitioning. Disk partitioning should be expanded consistent with previously specified "disk" requirements (described in FIG. 12 Section A) and consistent with the storage disks previously attached during the creation section of the Deployment phase.

After root partitioning has been expanding appropriately, the virtual system should be rebooted at 569. Once the virtual system has powered on following reboot, the following three actions 571, 573, 575 occur simultaneously (in one or more embodiments), using parallel automation techniques, for optimal configuration speeds. The first action 571 describes the process of executing custom configuration commands. Specific commands should be specified in the initial system requirements (FIG. 12 Section A). The implementor may choose to perform additional configuration commands as appropriate for the specific implementation. Examples of custom commands include, but are not limited to, installing packages, creating users and/or groups, configuring permissions, creating or executing files, etc. One skilled in the art will recognize that custom configuration commands should be written in appropriate syntax for the detected operating system for successful execution.

The second, simultaneous, action 573 describes the process of configuring applications required for the system. The application configuration requirements are specified as "application_bootstrap" in FIG. 12 Section A and may be implemented using various third-party or internally developed application configuration tools. Non-limiting examples of third-party application configuration tools include Chef (available from Chef Software, Inc., Seattle, Wash., USA), Puppet (available from Puppet Co., Portland, Oreg., USA) and Ansible (available from Red Hat, Inc., Raleigh, N.C., USA). The third, simultaneous, action 575 describes the process of configuring backup solutions required for the system. The backup solution configuration requirements are specified as "backup_solution" in FIG. 12 Section A and may be implemented using various third-party or internally developed backup solution tools. Once the virtual system configuration process has completed, the virtual build status should be marked as complete at 555 and the OTTR Constructor Provision system should continue to the Validation phase 557.

Figure 16:
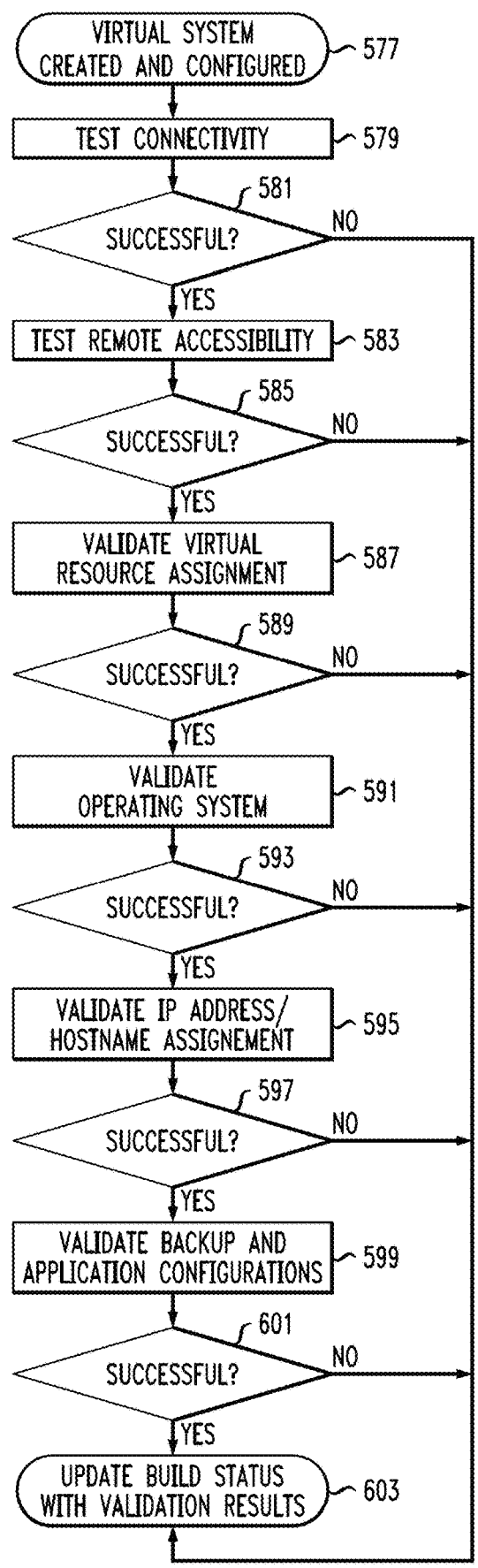
FIG. 16 illustrates a workflow diagram of an exemplary Validation phase, according to an aspect of the invention.

FIG. 16 illustrates a workflow diagram for the Validation phase of the OTTR Constructor Provision system. The Validation phase is implemented to confirm successful virtual system creation and configuration, if applicable, following the initial virtual system requirements acquired in the Requirement Collection phase. In one or more embodiments, the Validation phase should only be initiated if all virtual systems have been created successfully, regardless of their configuration status. In addition, the previously-illustrated, required workflows should complete successfully to reach the Validation phase, as per 577. The first step 579 is to test virtual system connectivity. The implementation for this step ranges but may include a ping test of the allocated and configured IP address. In this regard, various methods can be used to validate IP address, resources assigned, operating system, etc. However, the values returned by these methods should typically match the initial requirements provided. If connectivity is confirmed (YES branch of decision block 581), the next step 583 is to test the remote accessibility of the system. Various methods for testing remote accessibility can be employed, as will be apparent to the skilled artisan, given the teachings herein. In one or more embodiments, the outcome should remain consistent with the initial system requirements and standards implemented. If remote accessibility is confirmed (YES branch of decision block 585), the next step 587 is to validate the allocated virtual resources. Various methods for validating the systems assigned resources can be employed, as will be apparent to the skilled artisan, given the teachings herein. In one or more embodiments, the allocated resources should remain consistent with the initial virtual system requirements.

If virtual resource assignment is validated (YES branch of 589), the next step 591 is to validate the operating system. Various methods for validating the operating system can be employed, as will be apparent to the skilled artisan, given the teachings herein. In one or more embodiments, the detected operating system should remain consistent with the initial specification in the virtual system requirements. If the operating system is validated (YES branch of 593), the next step 595 is to validate the IP address and hostname assignment. Various methods for validating the IP address and hostname can be employed, as will be apparent to the skilled artisan, given the teachings herein—depending, for example, on the virtual infrastructure management system and IPAM system being utilized. In one or more embodiments, the IP address and hostname assignment should remain consistent with the initial virtual system requirements acquired during the Requirement Collection phase and the IP address allocated during the Build Preparation phase. If the hostname and IP address is verified (YES branch of 597), the final step 599 of the Validation phase is to test backup and application configurations. The methods for validating backup and application configurations will vary, but should produce results consistent with the "backup_solution" and "application_bootstrap" fields specified in the virtual system requirements (FIG. 12 Section A). Once the previous validation processes have completed (YES branch of block 601), and their results stored, the Validation phase is complete and the OTTR Constructor Provision system should continue to the Release phase at 603.

If any of the decision blocks 581, 585, 589, 593, 597, or 601 yields a NO, proceed to 603 with an indication that validation failed.

Figure 17:
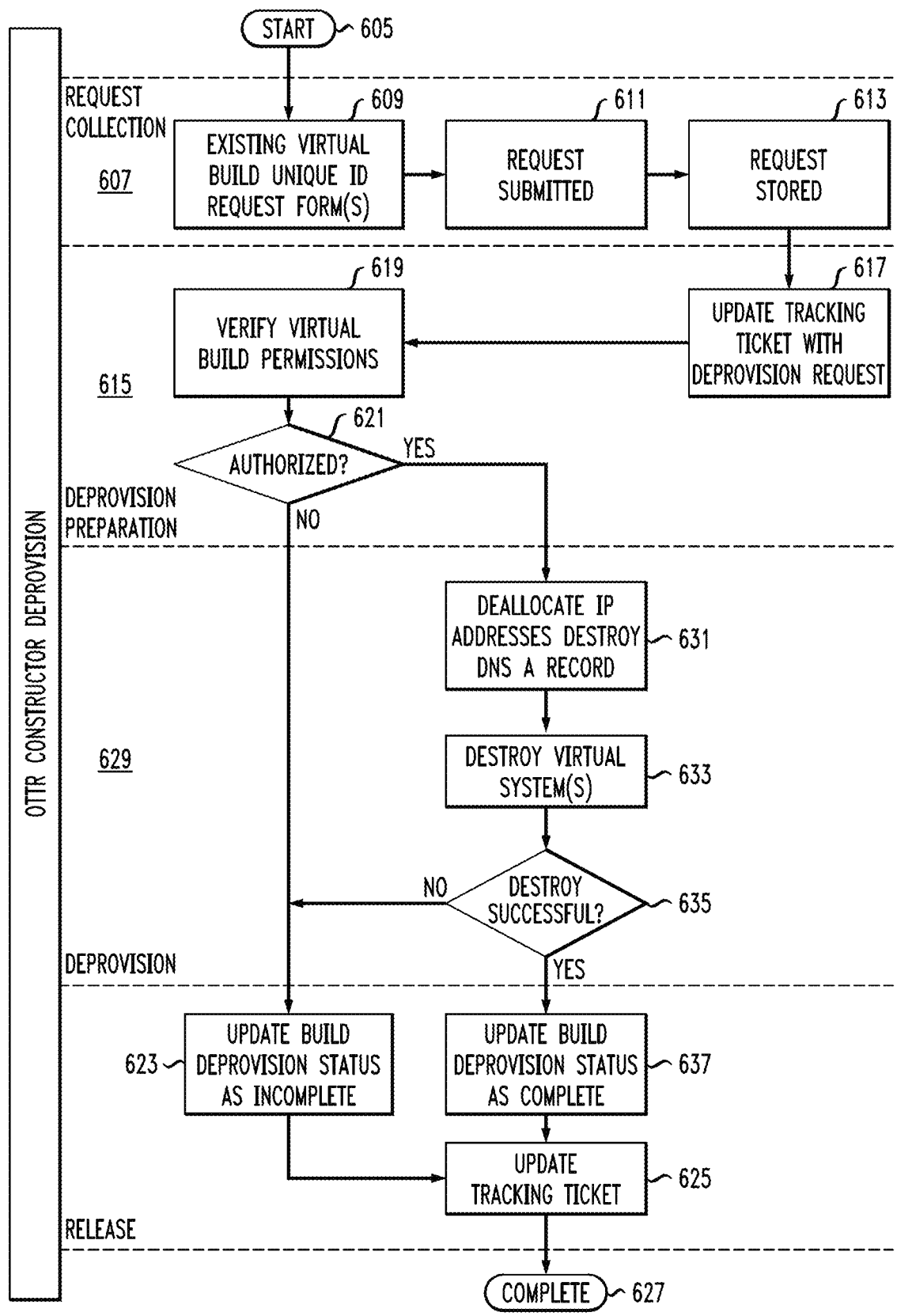
FIG. 17 illustrates an in-depth workflow diagram of four steps of OTTR Constructor Deprovision and how each phase is transitioned, according to an aspect of the invention.

FIG. 17 illustrates an in-depth workflow diagram of the various four steps of the OTTR Constructor Deprovision system and how each phase is transitioned. The flow chart begins at 605. The first phase 607 of the deprovisioning process is request collection. An authenticated user provides an existing virtual build unique ID via the request form, at 609. Once the request is submitted, at 611, it will be stored in the backend system at 613 for tracking and processing. The second phase 615, Deprovision Preparation, will initiate the process by updating the internal tracking ticket at 617 with the deprovision request. The system will perform an authorization task to verify that the specific user requesting the deprovision of the build has sufficient permission, at 619. If the user does not have sufficient permission (no branch of 621), the system will not continue to process the deprovision request, but instead, at 623, 625 will update the deprovision status as Incomplete on the tracking ticket. The flow then continues at 627.

If the user is authorized to perform the deprovision action (YES branch of 621), the deprovision request will continue. The third phase 629, Deprovision, handles the task of deprovisioning and destroying virtual resources. The system will first gather all of the resources for the build's unique identifier and initiate a request to deallocate associated IP addresses and destroy all associated "A" records in the DNS system, at 631. The system will then destroy all virtual containers associated with the build and release their virtual CPU, virtual memory, and delete and release the associated disk space, at 633. If the deprovision phase fails (NO branch of block 635), the system will update the deprovision status as incomplete and update the tracking ticket at 623, 625. If the deprovision phase is successful (YES branch of 635), the system will update the build deprovision status as complete at 637 and update the tracking system at 625.

Figure 18A:
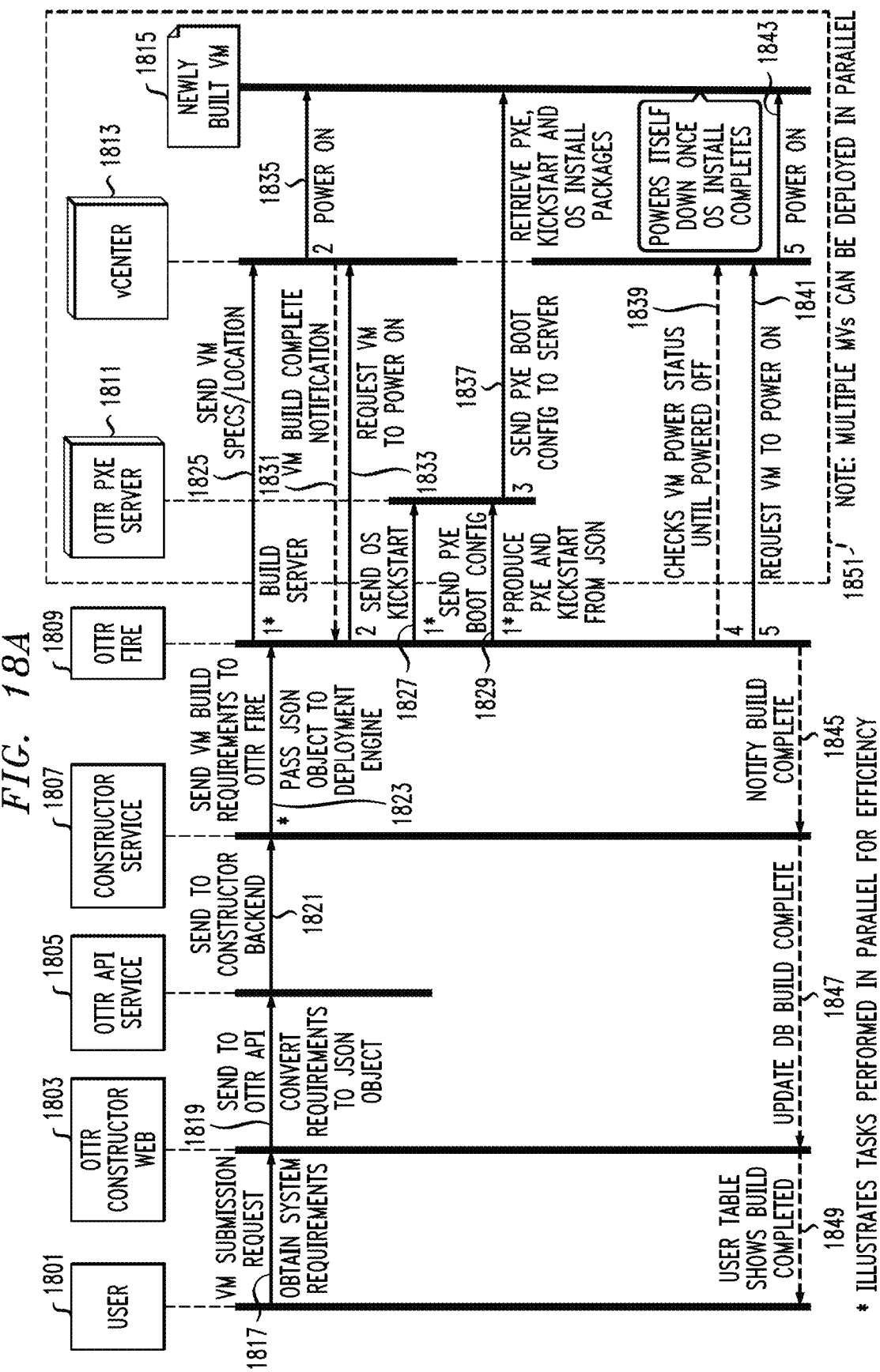
FIGS. 18A and 18B, collectively
Figure 18B:
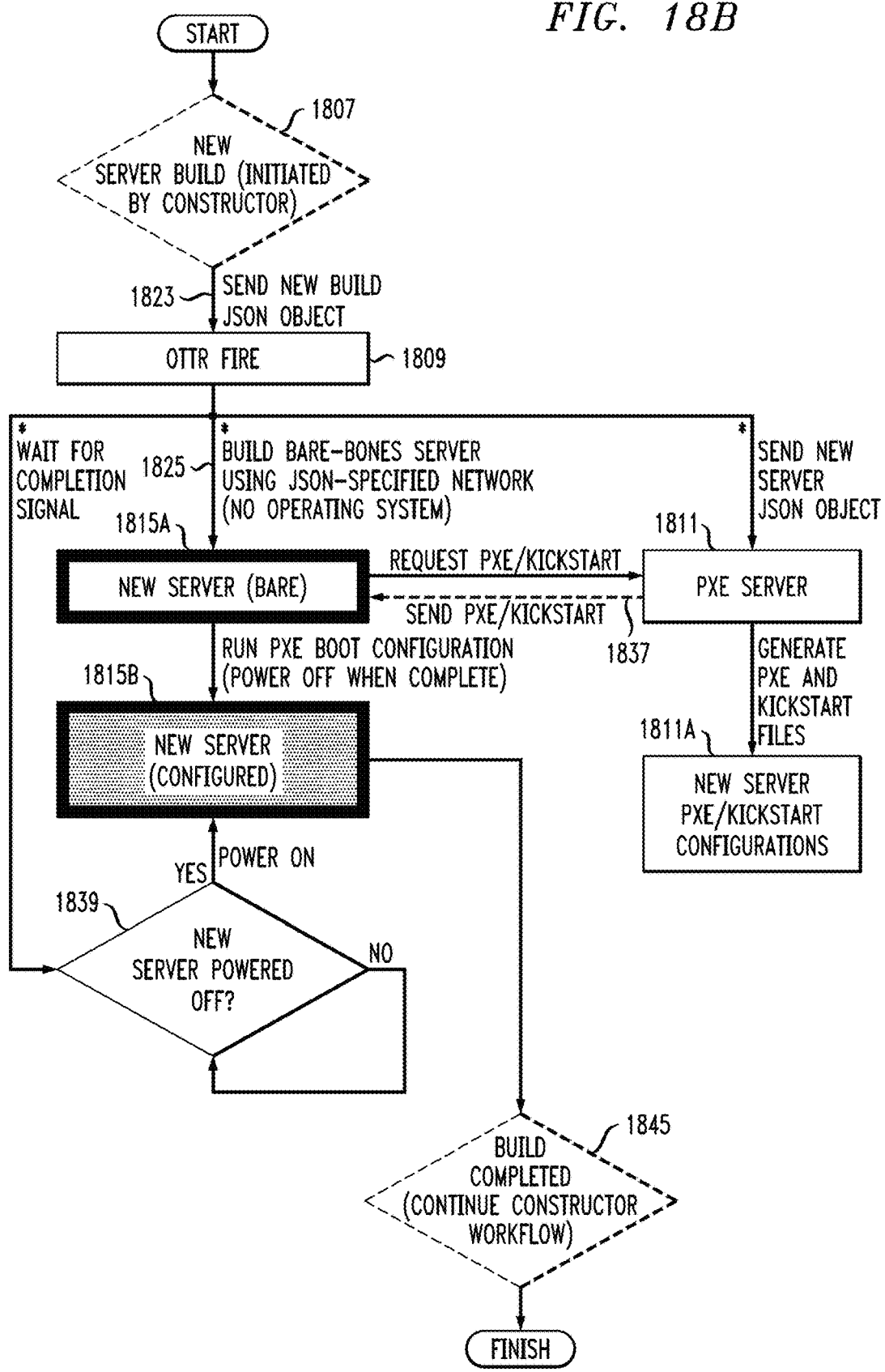

Refer to FIGS. 18A and 18B. In one or more embodiments, the above-described OTTR Constructor is provided with a framework that allows a virtual machine (VM) to be built with nearly unlimited customization; non-limiting embodiments of same are referred to herein as "OTTR Fire" 1809. OTTR Fire uses kickstart installations to allow a VM to be built to the user's preference. Embodiments of OTTR Fire provide the ability to customize packages, multiple drives, multiple partitions, CPU, RAM utilizing many more Linux distributions, and the like. In one or more embodiments, data from a JSON object is placed into a PXE template and the PXE template is used to build the system. Multiple templates can be used by the different engines to carry out the deployment. One or more embodiments provide at least two templates to at least two engines to carry out the deployment. One or more embodiments provide the ability to create a VM from scratch. In one or more embodiments, worker threads are computer processes executed by engines in accordance with PXE templates. A PXE template will build one system with the given requirements. Multi-threading can be used to build multiple different systems (VMs) at the same time. One or more embodiments create a plurality of templates and build systems from them simultaneously. A single JSON file specifies multiple systems in one or more embodiments. For each of the systems, a PXE is created, which is in turn provided to an engine that is creating a thread. The threads are executed in parallel in one or more embodiments.

Furthermore, regarding the ability to create VMs from scratch, in one or more embodiments, take all the user requirements such as disk partition, memory settings, operating system permissions, and the like, and convert the requirements to PXE format. Once the PXE format has been obtained, it is possible to build from scratch with those requirements, via a customized conversion process. Taking the JSON object and then creating the PXEs permits creating the VM from scratch rather than merely copying an existing golden master. Embodiments include functionality that takes a JSON file, verifies it, and converts it to the PXE format. The user 1801 triggers an action and submits the VM request at 1817 (the request can be entered, for example, via a user tool, GUI, self-contained form, or the like—the user enters all the appropriate parameters). The request is received by OTTR constructor web 1803. At 1819, the request is sent to the OTTR API service 1805. Initial processing of the JSON is carried out by service 1805, and the file is then sent to the constructor service 1807 as seen at 1821.

Thus, the initial back end takes the form data and from there sends it to the constructor (engine). User parameters are entered into the JSON file in the OTTR Constructor web part 1803. The JSON object is submitted to the back end as described at 1819, 1805, 1821, 1807. Numerous steps occur between the Constructor Service 1807 and OTTR Fire 1809. Gather the DNS IP address for each machine, carry out validation, determine where to locate the VMs (e.g. using VM Ware—make multiple API calls to the system). Also obtain permissions per location. When the user 1801 logs in, obtain the user ID and user profile. When ready to build the VM, use that profile to set the permissions. Refer to 1823, wherein the VM build requirements are sent to OTTR Fire 1809 and the JSON Object is passed to the deployment engine.

In one or more embodiments, the just-described activities are carried out before the VM is actually built, and multi-threading begins. Now, at OTTR Fire 1809, for the first VM to be built, strip out all the requirements for that VM and verify presence of same (e.g., the DNS) prior to creating the PXE template, since certain things need to be in place before creating the PXE template. Once they are in place, there is a verification process, and then the PXE boot file is created. There is communication between OTTR Fire 1809 and vCenter 1813; then, send the OS Kickstart to the PXE server 1811 (at 1827) and the PXE boot configuration to the PXE server 1811 (at 1829), and that results in a newly built VM 1815. Thus, in one or more embodiments, the multi-threading starts once OTTR Fire 1809 is invoked; pre-requisites (for example, the DNS) are addressed beforehand.

Indeed, in one or more embodiments, go through every VM request in the build and gather the DNS, all at once. By the time OTTR Fire 1809 is invoked, everything is in place so that multithreading can be carried out. Accordingly, in one or more embodiments, multithreading commences with OTTR Fire 1809. If instantiating multiple VMs, at 1825 "Send VM Specs/Location" and at 1831 "VM Build Complete Notification," the indicated operations happen in parallel for multiple VMs simultaneously with different threads. There is a parent process that spawns multiple threads—for example, if there are ten VMs in the request, the parent process will spawn ten child threads. The material in the dotted box 1851 to right of OTTR Fire 1809 represents one or more threads. Referring to 1827, 1829, the OTTR Fire element 1809 creates the PXE boot file, and sends it to the PXE server 1811. Once the PXE server 1811 has the file, OTTR Fire 1809 makes a request to vCenter 1813 to use the PXE file, as seen at 1833. At this point there is, in essence, the shell of an OS for the newly built VM 1815. When the system boots up (responsive to power on command 1835), it will pull in the PXE boot file and recreate the VM from scratch, using the requirements. Completion is confirmed at 1831.

By way of recapitulation, in one or more embodiments, OTTR Fire 1809 triggers and it communicates with vCenter 1813 initially at 1825 to make sure that the location for the VM to be built has the correct permissions and actually exists. After that, vCenter 1813 sends a notification back to OTTR Fire 1809 at 1831, and OTTR Fire 1809 sends the OS Kickstart at 1827. This is the stage where the Kickstart is created in one or more embodiments. As will be appreciated by the skilled artisan, a PXE template is also known as Kickstart. OTTR Fire 1809 sends the Kickstart file to the PXE server 1811 at 1827 and it also sends the PXE Boot Config at 1829. Refer now to arrow 1837 from OTTR PXE Server 1811 to Newly Built VM 1815. Create a minimal OS on the new server (new VM); when the new VM boots, it will pull in the PXE file—see notation "Retrieve PXE, Kickstart and OS Install Packages." In one or more embodiments, this is where the VM is completely built from scratch and customized.

In one or more embodiments, OTTR Fire 1809 checks with vCenter 1813 to confirm that the VM can be built, at 1825. If yes, OTTR Fire 1809 requests the VM to power on at 1833, and confirm back to OTTR Fire at 1831. In parallel, OTTR Fire 1809 creates a PXE file which is pulled up by the newly built VM 1815 when it boots, as seen at 1837, which allows VM 1815 to customize itself. In essence, a self-configuration process takes place—once the PXE file is present on the PXE server 1811, the new VM 1815 boots with the minimal OS and then pulls the PXE file in at 1837 and self-configures. For whatever is in the JSON object, the system builds custom functionality to create the requirements into a PXE file. FIG. 13, discussed above, depicts initial submission of the JSON.

Still referring to FIGS. 18A and 18B, in one or more embodiments, vCenter 1813 obtains the specifications of the "shell" or "skeleton" virtual machine(s) (RAM, storage, CPU count, typically not OS); at the same time, the configuration (e.g. what OS to install and what packages) is sent to the OTTR PXE server 1811. The VM powers on in the bare-bones "shell" or "skeleton" configuration and then obtains the PXE configuration from the PXE server 1811 and configures itself accordingly. When the installation is complete, the VM shuts itself down as a signal to OTTR Fire 1809 that the installation/configuration is complete. At 1841, OTTR Fire 1809 then commands the VM to power itself back on, at which point it is ready for service.

Regarding external components, in one or more embodiments, one Primary Preboot Execution Environment (PXE) and two PXE Relays are provided. In a non-limiting example, a vCenter (or similar server management software) (mark of VMware, Inc. Palo Alto, Calif., USA) environment has three virtual data centers with isolated VLANs (virtual local area networks). To avoid future issues possibly brought on by network changes and to give advanced options to the redirect, in one or more embodiments, VM PXE Relays are used instead of network policies to redirect a VM built outside the Primary's reach. See FIG. 19. Regarding the Primary PXE, in one or more embodiments, NGINX (mark of Nginx Software Inc., San Francisco, Calif., USA) is a web server used to host operating system (OS), PXE and Kickstart (Linux installation and configuration method) files. OS Images are mounted and contained in a read only state in order to prevent corruption of OS Build Packages and to preserve requested version. See FIG. 20.

In one or more embodiments, regarding DHCPD, standard configurations are used. DHCPD or DHCP daemon, as will be appreciated by the skilled artisan, is the name of a DHCP server program that operates as a daemon on a server to provide Dynamic Host Configuration Protocol (DHCP) service to a network. Regarding the standard configurations, in a non-limiting example, the only exception is choice of filename: 'filename "ipxelinux.0";' This is a custom built ipxe kernel (open source implementation of PXE known to the skilled artisan). A script has been embedded in one or more embodiments to greatly improve DHCP reliability.

Referring to FIGS. 21A and 21B, in Template CentOS KickStart, "???" and "####var####" represent data that will be generated by one or more embodiments of OTTR-FIRE. Furthermore, FIG. 21B also presents an Example PXE Config for a single Media Access Control (MAC) address. One or more embodiments provide a level of parallelism that cannot be replicated by a human operator. Regarding the PXE templates, in one or more embodiments, depending on the JSON, for each VM build, pass parameters to a PXE template to configure the file system, install packages, and customize. In one or more embodiments, the JSON object is stored internally and includes the requirements for the specific request; in one or more embodiments, it is not included into the trouble ticketing/tracking ticket. The ticketing is used to post build information and to notify the user when the job is ready—i.e., used for authorization, record keeping, and the like. Other embodiments could use other approaches.

Figure 22:
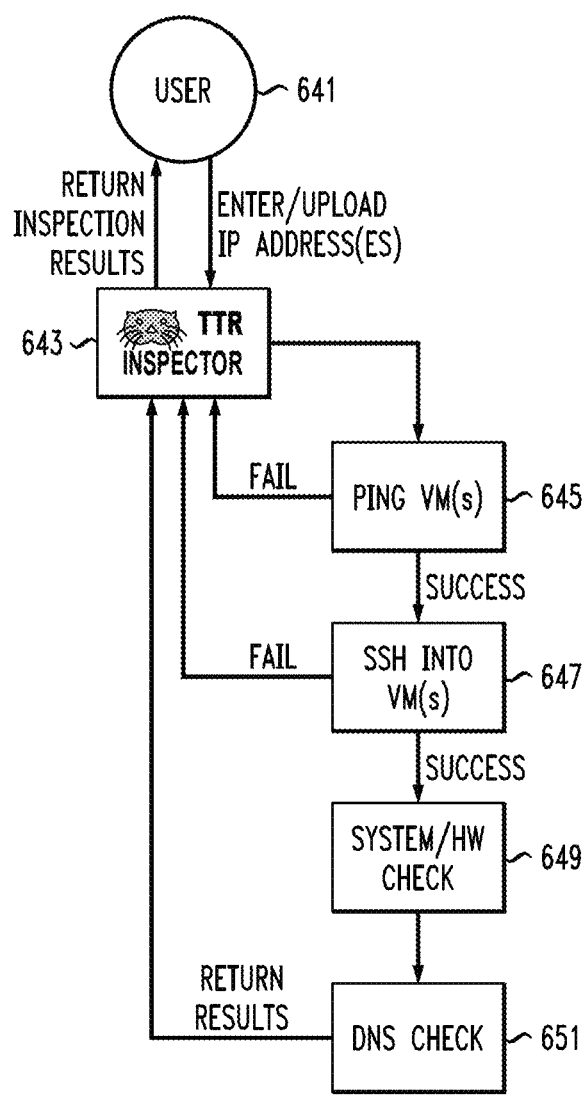
FIG. 22 shows an exemplary Inspector Architecture Overview, according to an aspect of the invention.

Referring to FIG. 22, one or more non-limiting exemplary embodiments referred to herein as OTTR INSPECTOR 643 advantageously run a health check of multiple virtual machines. One or more embodiments advantageously allow users to manually enter one IP address or FQDN to inspect; allow users to upload CSV with multiple IP addresses or FQDNs to inspect; run a validation script (e.g. Python 2.7) and Secure Socket Shell (ssh) into every virtual machine; and/or return statistics and pass/fail for usage metrics for each virtual machine. A non-limiting exemplary embodiment employs the following Python Dependencies; other embodiments could have different dependencies and/or use languages other than Python.

In a non-limiting example, Python 2.7 is installed with the following libraries:
 ipaddress
 paramiko
 dnspython
 pyyaml
 libffi
 python-devel
 libxml2-devel
 libxslt-devel
 openssl-devel In one or more embodiments, a server running the validation script should have the ipadmin SSH key and should run as the ipadmin user. Further, in one or more embodiments, servers being tested should have the ipadmin SSH key.

In one or more embodiments, adding ipadmin user and SSH key to supported VMs can be added to post-deployment scripts.

In a non-limiting example, pertinent files include:
 html/inspector.php page where users enter IP addresses/FQDNs or upload CSV to prompt inspection
 Validate/results.php handles POST request from inspector.php containing IP addresses to scan. Passes parsed and formatted IPs to process.php for running inspection.
 Validate/scripts/process.php takes POST request from results.php and runs the validation script. Prints results, which are grabbed by results.php
 Validate/scripts/hosthealthcheck.py validation script. Prompted by process.php.

In one or more embodiments, OTTR INSPECTOR is used to carry out the Validation process of FIG. 16. FIG. 22 shows an exemplary Inspector Architecture Overview. User 641 enters or uploads one or more IP addresses to the OTTR Inspector interface 643. This user interface is used for interaction with Inspector functionality, e.g. the user inputs an IP address and receives Inspector results here. In one or more embodiments, this user interface is implemented a as web interface. At 645, the inspector pings the corresponding virtual machine(s); failure is reported back to inspector 643 and user 641; upon success, proceed to block 647, Secure Socket Shell (ssh) into every virtual machine and run a validation script (e.g. Python 2.7). Failure is reported back to inspector 643 and user 641; upon success, proceed to block 649 and carry out a system/hardware check, then a DNS check at 651, with results returned to inspector 643 and user 641.

Figure 23:
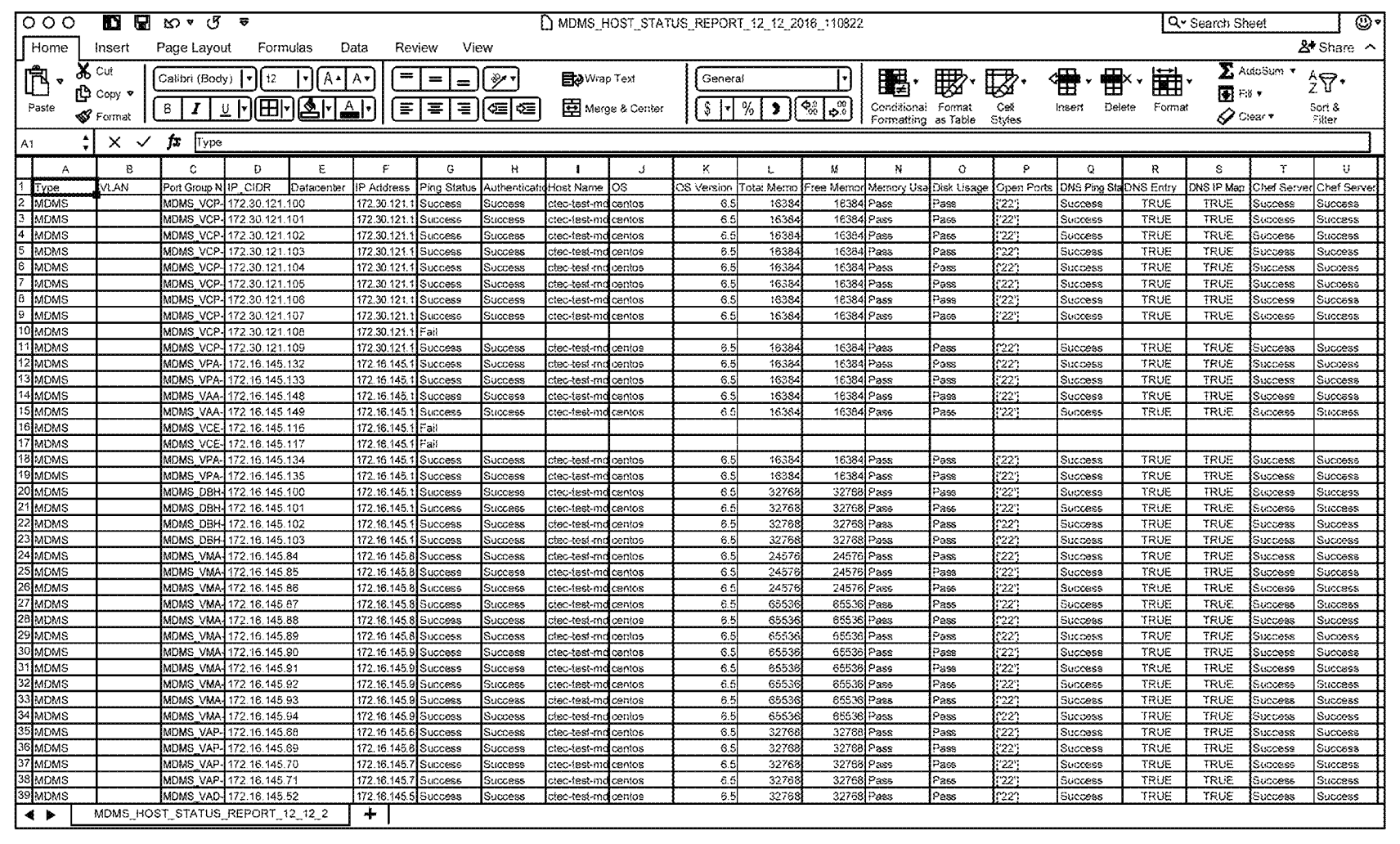

FIG. 23 shows an exemplary host status report, run on a catalog of IP addresses and returned to the user who initiated the inspection.

Figure 24:
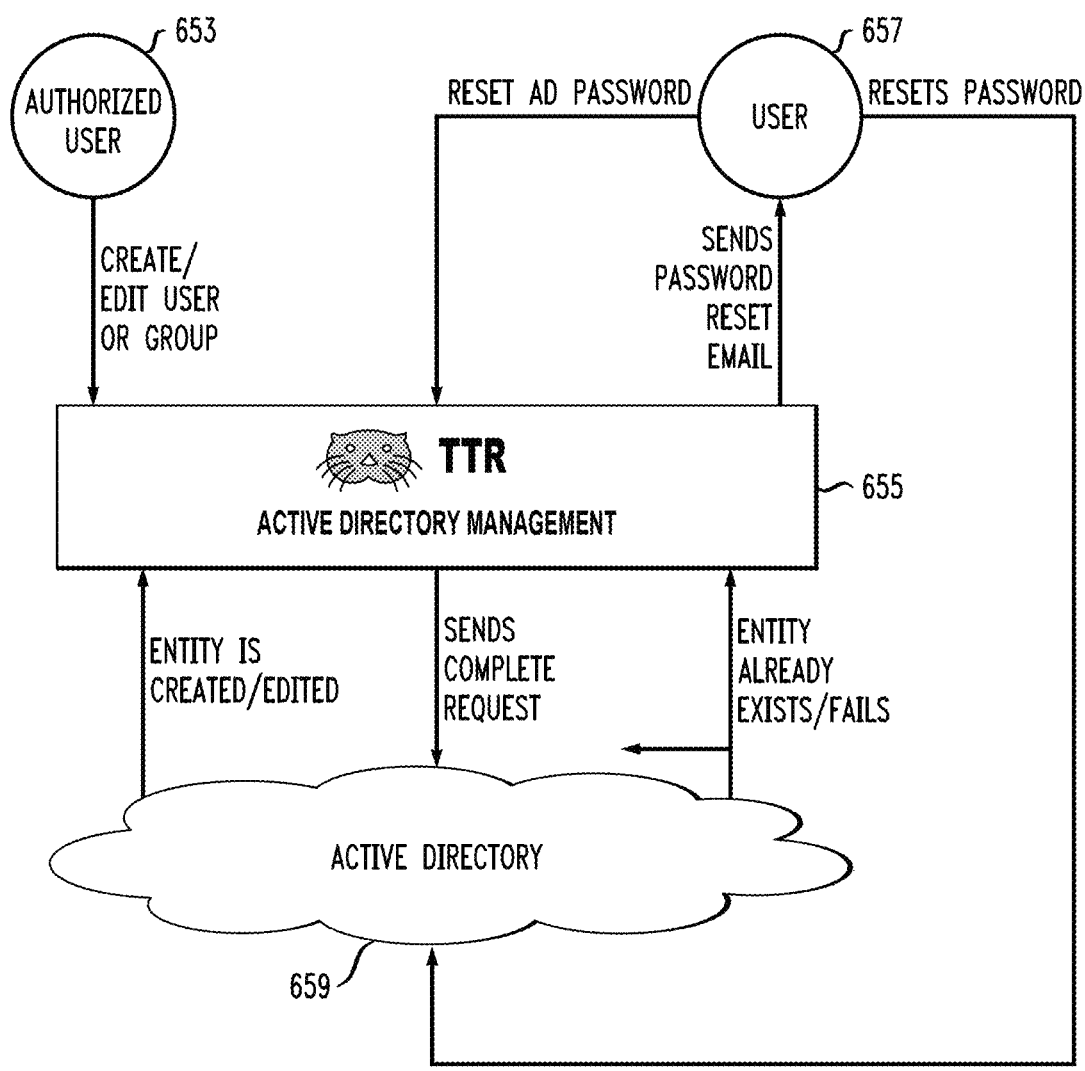
FIG. 24 shows an exemplary Active Directory Manager Architecture, according to an aspect of the invention.

Referring to FIG. 24, at least a portion of one or more non-limiting exemplary embodiments are referred to herein for convenience as the OTTR ACTIVE DIRECTORY (AD) MANAGER 655. Active Directory advantageously permits quick management of the active directory, allowing permitted users to create/edit users and groups' allowing all users to reset their AD password(s), and the like. In a non-limiting exemplary embodiment, an appropriate implementation framework includes Apache server with the php.ldap library. An exemplary Active Directory Manager Architecture is shown in FIG. 24. Authorized use 653 creates and/or edits a user and/or group via the OTTR Active Directory Management interface block 655. The interface is utilized by an authorized user, to interact with the OTTR Active Directory Management functionality. A password reset email is the sent to user 657 who resets his or her active directory password. Block 655 then sends a complete request to the Microsoft Active Directory (AD) directory service 659 or a similar service. A new entity is then created, or an existing entity edited, or it is determined that the entity already exists or the request fails. FIG. 23 is a table of returned results from an inspection run on over one hundred different IP addresses (only a portion is depicted for brevity). Each row contains inspection results for a different server/IP address.

One or more non-limiting exemplary embodiments are referred to herein for convenience as the OTTR—Self Provisioning Portal. One or more embodiments allow the user to design, build, test and launch a website that acts as a support portal for users. This site provides both fully and semiautomated tools for both the end user and technician. The goal is to minimize manual work and stream-line workflows to allow faster and more organized support.

In a non-limiting example, assume:
AD login (completed)
AD password reset (completed)
AD authenticated File Sharing "owncloud" (completed)
AD user creation with group permissions (completed)
VMware QuickView with VM actions (completed)
Finalized UI (75%)

The above list sets forth exemplary features of a user interface tool. When the user logs into OTTR, he or she can undertake additional tasks besides deployment/building VMs; for example, logging in with Active Directory (AD) credentials; resetting password; share files with other users; create users in AD and set their group permissions; provide a dashboard into VMware, and the like.

In one or more embodiments, active directory (AD) Web Utilities include LDAP (a web app for administering Lightweight Directory Access Protocol servers); VMware quick view/actions—JavaScript Front-end and Python Back-end; and VMware API metrics—API (application programming interface) calls using Python. VMware quick view refers to a view in a user interface that provides a quick overview for related systems.

By way of review and provision of additional detail, embodiments of OTTR Constructor provide a virtual system deployment engine. The user passes in requirements of his or her build and the engine routes the requirements to the appropriate engine. Depending on the different requirements, the requirements will be sent to different engines. For example, in one or more embodiments, there is an engine to clone VMs as well as OTTR Fire which builds VMs from scratch. Embodiments of OTTR Constructor also handle other things such as IP Provisioning. OTTR Constructor provides a routing engine for virtual system deployment. Embodiments of above-discussed OTTR Fire serve as one of the available engines in one or more embodiments and in one or more embodiments it handles identity management for deployment if the virtual systems.

Embodiments of OTTR Constructor provide a deployment engine which can connect to, for example, an IP management system—capability is provided beyond commercial cloud services platforms such as AWS; embodiments provision systems, for example, within a cable multi-services operator (MSO) or other broadband provider.

One or more embodiments include unique features related to IP address space and special templates for deployment. One or more embodiments create a tracking ticket, allocate IP addresses efficiently, and then deploy end-to-end.

Embodiments of the above-mentioned OTTR Constructor intakes requirements based on individual teams' needs on virtual system deployment, which may be different based on different teams, then routs the requirements to an appropriate build engine. The build engines can be different systems, e.g., AWS Management Portal for vCenter Server, different cloud providers, and the like. Embodiments of OTTR Constructor take the requirements and build around the process, creating the support tickets, documentation, provisioning IP addresses, and deploying the build.

In a non-limiting example, a video team has software they need to install on their systems based on their own requirements they may need modifications of the OS, certain IPs provisioned, certain packages installed on the VMs, specific versions of the VM—embodiments capture all the requirements in one user interface (UI) and route them to the specific engine that can handle that build, and also carry out the other processes attached. One or more embodiments document via a comprehensive support ticket, provisions the IPs, and then, using all the requirements, build out the OS from scratch or by cloning a template. Other teams may have their own requirements, required versions of certain packages, custom scripts to be executed during the build process, etc.

In one or more embodiments, scripts will modify the OS, pull down configuration requirements from an internal repository, carry out application installation/configuration, and the like.

Current systems such as HashiCorp Terraform typically only clone an existing image rather than building an OS from scratch. Embodiments of OTTR Fire can build a VM from scratch; interact with IPAM (IP Address Management System), AD authentication, Atlassian Jira® (registered mark of ATLASSIAN PTY LTD Sydney AUSTRALIA) tracking system, and the like.

Some existing tools provide limited functionality for some aspects of the deployment and management process. For example, there are stand-alone scripts and tools for some of the individual pieces, e.g., IP address, APIs to create JIRA tickets, and the like. These tools often require additional manual configuration and customizations. Advantageously, one or more embodiments provide a complete and customizable end-to-end infrastructure deployment and management solution. One or more embodiments advantageously overcome technical challenges by providing one or more of:

A task management schema to handle VM deployment efficiency, wherein tasks are dynamically orchestrated in multi-threaded processes for various system configurations, and multiple-VM builds.

A system that provides a basis for requirements, but still allow network, hardware, system and application customizability, achieved by defining a base use-case, allowing users to specify requirement parameters, and deploying VMs through a PXE KickStart to support full operating system customizability.

Methods to interconnect various external applications (e.g. IPAM, Active Directory, vCenter), achieved by creating modular functions and establishing a standard JSON object to be utilized throughout the management and deployment process.

Embodiments of OTTR Constructor provide an overall engine that controls the whole process, takes in requirements, and "specs out" and deploys the system. In one or more embodiments, the requirements are routed to an appropriate engine. Examples include vCenter's existing APIs to clone a VM—essentially consuming APIs of vCenter (a VM Ware product). One or more embodiments of OTTR Fire build one or more VMs from scratch. OTTR Constructor, in embodiments, can route to multiple different build processes. OTTR Fire is, in one or more embodiments, the specific build process that builds from scratch; in a hub and spoke fashion. Requirements hit OTTR Constructor which can build in different ways; OTTR Fire is one method that builds the OS and all requirements from scratch via massive parallelism with many different optimizations not available with current tools. Existing deployment methods frequently clone an existing operating system image, which presents restrictions on system customizability, e.g. customizing a filesystem. In one or more embodiments, OTTR Fire deploys VMs via a Preboot Execution Environment (PXE) server which allows multiple VMs to be deployed simultaneously over a network via a minimalistic boot configuration. One or more instances employ KickStart templates to deploy images by layering requirements on top of the boot configuration. In one or more embodiments, the automated PXE deployment delivered via OTTR Fire facilitates nearly-unlimited system customization. In one or more instances, OTTR Fire also delivers faster VM deployments, ideal for multi-VM builds.

Embodiments of OTTR Inspector provide additional functionality that allows, after the virtual system is built through one of the engines, validating the build (i.e. that it matches the requirements). Embodiments of OTTR Inspector communicate with the virtual systems after they are built and pull back information and match it to the requirements—e.g., testing that the virtual systems meet spec. For example, provision IP addresses—does the VM have the specified IP address? Embodiments of OTTR Inspector can be used to validate the entire build and/or troubleshoot. One or more embodiments extract data from the deployed system and pull it back to the UI—to verify initial deployment and/or to verify that the system is working properly.

Embodiments of the OTTR ID Management System can be used, for example, at least in part by Constructor. Part of the deployment process typically includes adding authentication into the new VMs; also allows managing groups and users directly from the OTTR pool outside of logging in from active directory. Terraform software typically does not integrate with authenticate or permission systems. Requirements to Constructor may include, in one or more embodiments, who on a group/team is an admin, who is an ordinary user. These requirements are, in one or more instances, sent to OTTR Constructor—which integrates with Active Directory (or other third party ID Management system) and give permissions on resources based on groups that users are members of One or more embodiments integrate with third party ID Management systems and give permissions on resources based on that.

Recapitulation

Given the discussion thus far, it will be appreciated that, in general terms, an exemplary method for parallel deployment of a plurality of virtual systems in a broadband network, according to an aspect of the invention, includes obtaining an electronic data structure (e.g., a JSON object or the like) specifying a set of requirements for each of the plurality of virtual systems to be deployed in parallel. Refer, for example, to step 1823 performed by OTTR Fire 1809. A further step (performed, e.g., by OTTR Fire 1809) includes parsing the sets of requirements in the electronic data structure to obtain a plurality of virtual system creation instruction files, one for each of the virtual systems to be deployed in parallel. The virtual system creation instructions files include information needed to create a virtual machine (VM) which can include, for example, a number of different files—in some embodiments, a PXE template (DHCP script that boots a VM over the network) and a "Kickstart" configuration file that is supplied to the OS installation to define the packages, partitioning, and the like. Refer to step 1811A in FIG. 18B. An even further step includes executing a plurality of threads in parallel, one for each of the virtual systems to be deployed in parallel, in accordance with the plurality of virtual system creation instruction files, to build the plurality of virtual systems. This (see steps 1825-1837) can, for example, be cooperatively performed by OTTR Fire 1809, PXE Server 1811, vCenter 1813 (or Amazon Web Services (AWS) or the like), and newly built VMs 1815.

In one or more embodiments, a first one of the threads is executed by a first engine, and a second one of the threads is executed by a second engine, different than the first engine. Non-limiting examples of suitable engines include vCenter and AWS or another virtual platform. In one or more embodiments, create a single JSON structure specifying multiple different VMs on different platforms. For example, specify thirty VMs. The first two may be specified to go through OTTR Fire to be built on VMWare while the third one may be specified to be built in AWS. A different engine will thus handle that platform—a single JSON file thus specifies multiple VMs to be built on multiple platforms, in one or more embodiments.

In some cases, the virtual systems are created from scratch without use of a so-called "golden master" (image to be copied).

In one or more embodiments, in the obtaining step, the requirements include disk partition, memory settings, and operating system permissions.

Some cases further include verifying the requirements with a back end prior to the parsing. Refer, for example, to step 1821 performed by Constructor Service 1807.

One or more embodiments further include verifying domain name server internet protocol address and location availability for each of the virtual systems; for example, by making application programming interface (API) calls to the engines (e.g. to vCenter or AWS).

In some cases, the parsing includes, with an installation framework (e.g. OTTR Fire 1809), for each of the plurality of virtual systems to be deployed in parallel, providing a boot template server (e.g. OTTR PXE Server 1811) with a corresponding one of the virtual system creation instruction files. Each of the virtual system creation instruction files in turn includes a boot template and a boot configuration (see steps 1827, 1829). Furthermore, in some cases, the executing of the plurality of threads in parallel includes: with the installation framework, for each of the threads, instructing a corresponding one of the engines to create a bare virtual server 1815A (see step 1825); with the boot template server, for each of the threads, sending a corresponding one of the boot configurations to a corresponding one of the bare virtual servers (see step 1837); and each of the bare virtual servers configuring itself in accordance with the corresponding one of the boot configurations and retrieving from the boot template server a corresponding one of the boot templates, to obtain a corresponding configured virtual server 1815B, see step 1837. Given the teachings, figures, and examples herein, the skilled artisan will be able to construct PXE templates or the like from the JSON file or the like.

In some cases, in the obtaining step, the electronic data structure includes a JavaScript Object Notation (JSON) object having a plurality of dictionary keys corresponding to the plurality of virtual systems. Furthermore, in some cases, the boot template server includes a Preboot Execution Environment (PXE) server, and, in the parsing step, the boot templates include Preboot Execution Environment (PXE) templates.

In another aspect, an exemplary apparatus (refer for example to FIG. 7, discussed below) for parallel deployment of a plurality of virtual systems in a broadband network includes one or more memory elements (e.g. RAM and/or on-processor portion of 730), one or more processors (e.g. 720) coupled to the one or more memory elements, and one or more non-transitory persistent storage mediums (e.g. hard drive portion(s) of 730) that contain instructions (e.g. one or more software and/or firmware modules) which, when loaded into the one or more memory elements, configure the one or more processors to carry out or otherwise facilitate any one, some or all of the method steps described herein. For example, in some cases, the apparatus could include an installation framework (e.g. OTTR Fire 1809); a boot template server (e.g. 1811) coupled to the installation framework; and at least one virtualization platform (discussed further below) coupled to the installation framework. In some cases, the installation framework obtains an electronic data structure (e.g., JSON object) specifying a set of requirements for each of the plurality of virtual systems to be deployed in parallel (see step 1823); the installation framework parses the sets of requirements in the electronic data structure to obtain a plurality of virtual system creation instruction files (discussed elsewhere herein), one for each of the virtual systems to be deployed in parallel; and the installation framework, the boot template server, and the at least one virtualization platform cooperatively execute a plurality of threads in parallel, one for each of the virtual systems to be deployed in parallel, in accordance with the plurality of virtual system creation instruction files, to build the plurality of virtual systems. Refer to exemplary discussion elsewhere herein of OTTR Fire 1809, PXE Server 1811, vCenter 1813 (or Amazon Web Services (AWS) or the like), and newly built VMs 1815 cooperatively performing steps 1825-1837.

In general, the virtualization platform can include an engine and an underlying hardware infrastructure on which the virtual servers can be constructed. For example, the at least one virtualization platform can include a first virtualization platform, in turn including a first engine and a first underlying hardware infrastructure; and a second virtualization platform, in turn including a second engine and a second underlying hardware infrastructure. A first one of the threads is then executed by the first engine, and a second one of the threads is executed by the second engine. The second engine is different than the first engine in one or more embodiments. Refer to exemplary discussion above of vCenter and Amazon Web Services or another virtual platform.

In one or more embodiments, for each of the plurality of virtual systems to be deployed in parallel, the installation framework provides the boot template server with a corresponding one of the virtual system creation instruction files; each of the virtual system creation instruction files in turn includes a boot template and a boot configuration (refer for example to steps 1827, 1829). Furthermore, in one or more embodiments, the installation framework instructs a corresponding one of the engines to create a bare virtual server 1815A in a corresponding one of the underlying hardware infrastructures (refer for example to step 1825) and the boot template server sends a corresponding one of the boot configurations to a corresponding one of the bare virtual servers (see step 1837). Each of the bare virtual servers configures itself in accordance with the corresponding one of the boot configurations and retrieves from the boot template server a corresponding one of the boot templates, to obtain a corresponding configured virtual server 1815B (see step 1837).

In a non-limiting example, the electronic data structure includes a JavaScript Object Notation (JSON) object having a plurality of dictionary keys corresponding to the plurality of virtual systems; the boot template server includes a Preboot Execution Environment (PXE) server; and/or the boot templates include Preboot Execution Environment (PXE) templates.

In still another aspect, an exemplary non-transitory computer readable medium includes computer executable instructions which when executed by a computer cause the computer to perform any one, some or all of the method steps described herein.

System and Article of Manufacture Details

The invention can employ software aspects wherein virtual servers are configured (although the virtual servers do of course run on underlying hardware). Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
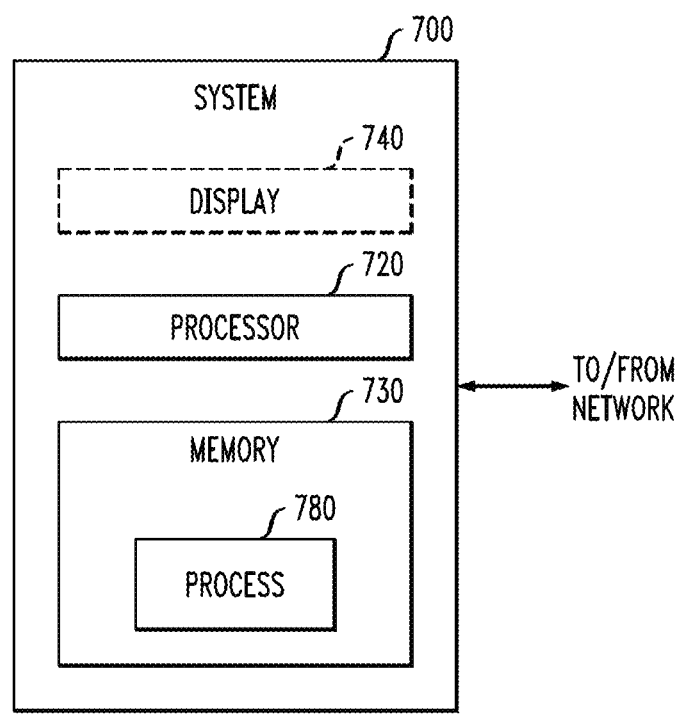
FIG. 7 is a block diagram of a computer system useful in connection with one or more aspects of the invention.

FIG. 7 is a block diagram of a system 700 that can implement at least some aspects of the invention, and is representative, for example, of one or more physical servers (the skilled artisan will appreciate that virtual servers are typically implemented using hypervisor programs or the like on top of underlying physical servers). As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks as depicted in FIGS. 18A and 18B). The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or more or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for parallel deployment of a plurality of virtual systems in a broadband network, said method comprising:
    obtaining an electronic data structure specifying a set of requirements for each of said plurality of virtual systems to be deployed in parallel;
    parsing said sets of requirements in said electronic data structure to obtain a plurality of virtual system creation instruction files, one for each of said virtual systems to be deployed in parallel; and
    executing a plurality of newly-created threads in parallel, one for each of said virtual systems to be deployed in parallel, in accordance with said plurality of virtual system creation instruction files, to build said plurality of virtual systems;
    wherein a first one of said a plurality of newly-created threads in parallel is executed by a first engine, and a second one of said a plurality of newly-created threads in parallel is executed by a second engine, different than said first engine, and wherein said first engine includes a first server management utility and said second engine includes a second server management utility, different than said first server management utility.

2. The method of claim 1, wherein said virtual systems are created from scratch without use of a golden master.

3. The method of claim 2, wherein, in said obtaining step, said requirements include disk partition, memory settings, and operating system permissions.

4. The method of claim 3, further comprising verifying said requirements with a back end prior to said parsing.

5. The method of claim 4, further comprising verifying domain name server internet protocol address and location availability for each of said virtual systems.

6. The method of claim 5, wherein said verifying comprises making application programming interface calls to said first and second engines.

7. The method of claim 1, wherein said parsing comprises, with an installation framework, for each of said plurality of virtual systems to be deployed in parallel, providing a boot template server with a corresponding one of said virtual system creation instruction files, each of said virtual system creation instruction files in turn comprising a boot template and a boot configuration.

8. A method for parallel deployment of a plurality of virtual systems in a broadband network, said method comprising:

obtaining an electronic data structure specifying a set of requirements for each of said plurality of virtual systems to be deployed in parallel;

parsing said sets of requirements in said electronic data structure to obtain a plurality of virtual system creation instruction files, one for each of said virtual systems to be deployed in parallel; and executing a plurality of threads in parallel, one for each of said virtual systems to be deployed in parallel, in accordance with said plurality of virtual system creation instruction files, to build said plurality of virtual systems;

wherein a first one of said plurality of threads in parallel is executed by a first engine, and a second one of said plurality of threads in parallel is executed by a second engine, different than said first engine;

wherein said parsing comprises, with an installation framework, for each of said plurality of virtual systems to be deployed in parallel, providing a boot template server with a corresponding one of said virtual system creation instruction files, each of said virtual system creation instruction files in turn comprising a boot template and a boot configuration; and wherein said executing of said plurality of threads in parallel comprises:

with said installation framework, instructing a corresponding one of said first and second engines to create a bare virtual server for each of said threads, thus resulting in a plurality of bare virtual servers;

with said boot template server, for each of said threads, sending a corresponding one of said boot configurations to a corresponding one of said bare virtual servers; and each of said bare virtual servers configuring itself in accordance with said corresponding one of said boot configurations and retrieving from said boot template server a corresponding one of said boot templates, to obtain a corresponding configured virtual server.

9. The method of claim 8, wherein, in said obtaining step, said electronic data structure comprises an object having a plurality of dictionary keys corresponding to said plurality of virtual systems.

10. The method of claim 9, wherein said boot template server comprises a Preboot Execution Environment (PXE) server, and wherein, in said parsing step, said boot templates comprise Preboot Execution Environment (PXE) templates.

11. An apparatus for parallel deployment of a plurality of virtual systems in a broadband network, said apparatus comprising:

an installation framework implemented on at least one hardware processor;

a boot template server implemented on said at least one hardware processor and coupled to said installation framework; and at least one virtualization platform implemented on said at least one hardware processor and coupled to said installation framework;

wherein:

said installation framework obtains an electronic data structure specifying a set of requirements for each of said plurality of virtual systems to be deployed in parallel;

said installation framework parses said sets of requirements in said electronic data structure to obtain a plurality of virtual system creation instruction files, one for each of said virtual systems to be deployed in parallel; and said installation framework, said boot template server, and said at least one virtualization platform cooperatively execute a plurality of newly-created threads in parallel, one for each of said virtual systems to be deployed in parallel, in accordance with said plurality of virtual system creation instruction files, to build said plurality of virtual systems;

wherein:

said at least one virtualization platform comprises:

a first virtualization platform, in turn comprising a first engine and a first underlying hardware infrastructure; and a second virtualization platform, in turn comprising a second engine and a second underlying hardware infrastructure; and a first one of said plurality of newly-created threads in parallel is executed by said first engine, and a second one of said plurality of newly-created threads in parallel is executed by said second engine, said second engine being different than said first engine, said first engine including a first server management utility and said second engine including a second server management utility, different than said first server management utility.

12. The apparatus of claim 11, wherein said installation framework, for each of said plurality of virtual systems to be deployed in parallel, provides said boot template server with a corresponding one of said virtual system creation instruction files, each of said virtual system creation instruction files in turn comprising a boot template and a boot configuration.

13. An apparatus for parallel deployment of a plurality of virtual systems in a broadband network, said apparatus comprising:

an installation framework implemented on at least one hardware processor;

a boot template server implemented on said at least one hardware processor and coupled to said installation framework; and at least one virtualization platform implemented on said at least one hardware processor and coupled to said installation framework;

wherein:

said installation framework obtains an electronic data structure specifying a set of requirements for each of said plurality of virtual systems to be deployed in parallel;

said installation framework parses said sets of requirements in said electronic data structure to obtain a plurality of virtual system creation instruction files, one for each of said virtual systems to be deployed in parallel; and said installation framework, said boot template server, and said at least one virtualization platform cooperatively execute a plurality of threads in parallel, one for each of said virtual systems to be deployed in parallel, in accordance with said plurality of virtual system creation instruction files, to build said plurality of virtual systems;

wherein, for each of said plurality of virtual systems to be deployed in parallel, said installation framework provides said boot template server with a corresponding one of said virtual system creation instruction files, each of said virtual system creation instruction files in turn comprising a boot template and a boot configuration;

wherein, for each of said plurality of threads in parallel, said installation framework instructs a corresponding one of said first and second engines to create a bare virtual server in a corresponding one of said underlying hardware infrastructures;

wherein, for each of said plurality of threads in parallel, said boot template server sends a corresponding one of said boot configurations to a corresponding one of said bare virtual servers; and wherein each of said bare virtual servers configures itself in accordance with said corresponding one of said boot configurations and retrieves from said boot template server a corresponding one of said boot templates, to obtain a corresponding configured virtual server.

14. The apparatus of claim 13, wherein said electronic data structure comprises an object having a plurality of dictionary keys corresponding to said plurality of virtual systems.

15. The apparatus of claim 14, wherein:
said boot template server comprises a Preboot Execution Environment (PXE) server; and
said boot templates comprise Preboot Execution Environment (PXE) templates.

16. A non-transitory computer readable medium comprising computer executable instructions which when executed by a computer cause the computer to perform a method for parallel deployment of a plurality of virtual systems in a broadband network, comprising:
obtaining an electronic data structure specifying a set of requirements for each of said plurality of virtual systems to be deployed in parallel;
parsing said sets of requirements in said electronic data structure to obtain a plurality of virtual system creation instruction files, one for each of said virtual systems to be deployed in parallel; and
executing a plurality of newly-created threads in parallel, one for each of said virtual systems to be deployed in parallel, in accordance with said plurality of virtual system creation instruction files, to build said plurality of virtual systems;
wherein a first one of said a plurality of newly-created threads in parallel is executed by a first engine, and a second one of said a plurality of newly-created threads in parallel is executed by a second engine, different than said first engine, and wherein said first engine includes a first server management utility and said second engine includes a second server management utility, different than said first server management utility.

17. The non-transitory computer readable medium of claim 16, wherein said parsing comprises, with an installation framework, for each of said plurality of virtual systems to be deployed in parallel, providing a boot template server with a corresponding one of said virtual system creation instruction files, each of said virtual system creation instruction files in turn comprising a boot template and a boot configuration.

18. A non-transitory computer readable medium comprising computer executable instructions which when executed by a computer cause the computer to perform a method for parallel deployment of a plurality of virtual systems in a broadband network, comprising:
obtaining an electronic data structure specifying a set of requirements for each of said plurality of virtual systems to be deployed in parallel;
parsing said sets of requirements in said electronic data structure to obtain a plurality of virtual system creation instruction files, one for each of said virtual systems to be deployed in parallel; and
executing a plurality of threads in parallel, one for each of said virtual systems to be deployed in parallel, in accordance with said plurality of virtual system creation instruction files, to build said plurality of virtual systems;
wherein a first one of said plurality of threads in parallel is executed by a first engine, and a second one of said plurality of threads in parallel is executed by a second engine, different than said first engine;
wherein said parsing comprises, with an installation framework, for each of said plurality of virtual systems to be deployed in parallel, providing a boot template server with a corresponding one of said virtual system creation instruction files, each of said virtual system creation instruction files in turn comprising a boot template and a boot configuration; and
wherein said executing of said plurality of threads in parallel comprises:
with said installation framework, for each of said threads, instructing a corresponding one of said first and second engines to create a bare virtual server;
with said boot template server, for each of said threads, sending a corresponding one of said boot configurations to a corresponding one of said bare virtual servers; and
each of said bare virtual servers configuring itself in accordance with said corresponding one of said boot configurations and retrieving from said boot template server a corresponding one of said boot templates, to obtain a corresponding configured virtual server.

19. The non-transitory computer readable medium of claim 18, wherein, in said obtaining step, said electronic data structure comprises an object having a plurality of dictionary keys corresponding to said plurality of virtual systems.

20. The non-transitory computer readable medium of claim 19, wherein said boot template server comprises a Preboot Execution Environment (PXE) server, and wherein, in said parsing step, said boot templates comprise Preboot Execution Environment (PXE) templates.

* * * * *